(12) United States Patent
Sakai et al.

(10) Patent No.: US 10,019,007 B2
(45) Date of Patent: *Jul. 10, 2018

(54) WORK MACHINE CONTROL SYSTEM, WORK MACHINE, AND WORK MACHINE MANAGEMENT SYSTEM

(71) Applicant: Komatsu Ltd., Tokyo (JP)

(72) Inventors: Atsushi Sakai, Hiratsuka (JP); Masanori Minagawa, Hiratsuka (JP); Daisuke Tanaka, Hiratsuka (JP); Mitsuhiro Ryuman, Hiratsuka (JP); Yosuke Kadono, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 15/124,890

(22) PCT Filed: Feb. 1, 2016

(86) PCT No.: PCT/JP2016/052939
§ 371 (c)(1),
(2) Date: Sep. 9, 2016

(87) PCT Pub. No.: WO2016/093373
PCT Pub. Date: Jun. 16, 2016

(65) Prior Publication Data
US 2017/0220042 A1 Aug. 3, 2017

(51) Int. Cl.
*G05D 1/02* (2006.01)
*G05D 1/00* (2006.01)
*E21F 13/00* (2006.01)

(52) U.S. Cl.
CPC .......... *G05D 1/0212* (2013.01); *E21F 13/00* (2013.01); *G05D 1/0088* (2013.01); *G05D 1/0231* (2013.01); *G05D 2201/021* (2013.01)

(58) Field of Classification Search
CPC .............. G05D 1/0274; G05D 1/0219; G05D 2201/0202
(Continued)

(56) References Cited

U.S. PATENT DOCUMENTS 6,064,926 A 5/2000 Sarangapani et al.
6,226,572 B1 5/2001 Tojima et al.
(Continued)

FOREIGN PATENT DOCUMENTS

JP 10-222227 A 8/1998
JP 11-242520 A 9/1999
(Continued)

OTHER PUBLICATIONS

Foresti et al., Multisensor Data Fusion for Autonomous Vehicle Navigation in Risky Environments, 2002, IEEE, p. 1165-1185.*
(Continued)

*Primary Examiner* — Mcdieunel Marc
(74) *Attorney, Agent, or Firm* — Locke Lord LLP

(57) ABSTRACT

A work machine control system is configured to control a work machine that travels in an operation region and includes a position detection unit, a non-contact sensor, and a control unit. The position detection unit detects a position of the work machine. The non-contact sensor detects a position of an object around the work machine. The control unit extracts information on an object to be detected from a detection result of the position detection unit and a detection result of the non-contact sensor, and excludes moving object information that is information on an object to be detected regarding a moving object that moves in the operation region.

10 Claims, 14 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 2016/0185346 | A1* | 6/2016 | Awamori | G05D 1/0231 |
| | | | | 701/23 |
| 2017/0017238 | A1* | 1/2017 | Tojima | G01S 13/876 |
| 2017/0031367 | A1* | 2/2017 | Tojima | G05D 1/027 |
| 2017/0122741 | A1* | 5/2017 | Sakai | G01S 19/46 |
| 2017/0124862 | A1* | 5/2017 | Sakai | G01C 21/26 |
| 2017/0192434 | A1* | 7/2017 | Kou | G05D 1/0223 |
| 2017/0220042 | A1* | 8/2017 | Sakai | G05D 1/0088 |
| 2017/0269591 | A1* | 9/2017 | Tanaka | G05D 1/0088 |

FOREIGN PATENT DOCUMENTS

| | | |
|---|---|---|
| JP | 2011-253377 A | 12/2011 |
| JP | 2014-203429 A | 10/2014 |
| WO | 2015/097909 A1 | 7/2015 |

OTHER PUBLICATIONS

International Search Report dated Mar. 15, 2016, issued for PCT/JP2016/052939.

* cited by examiner

FIG.7
FIG.8
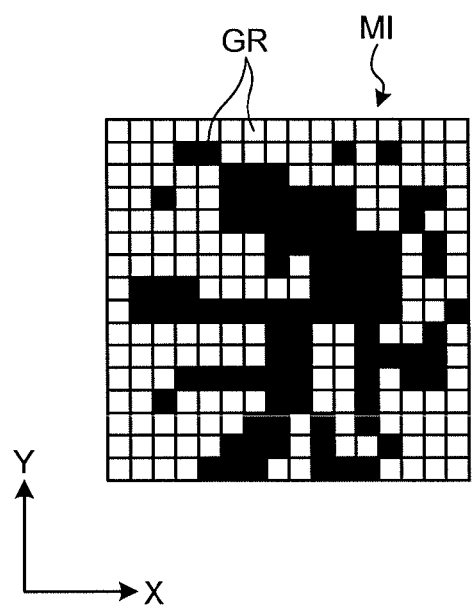

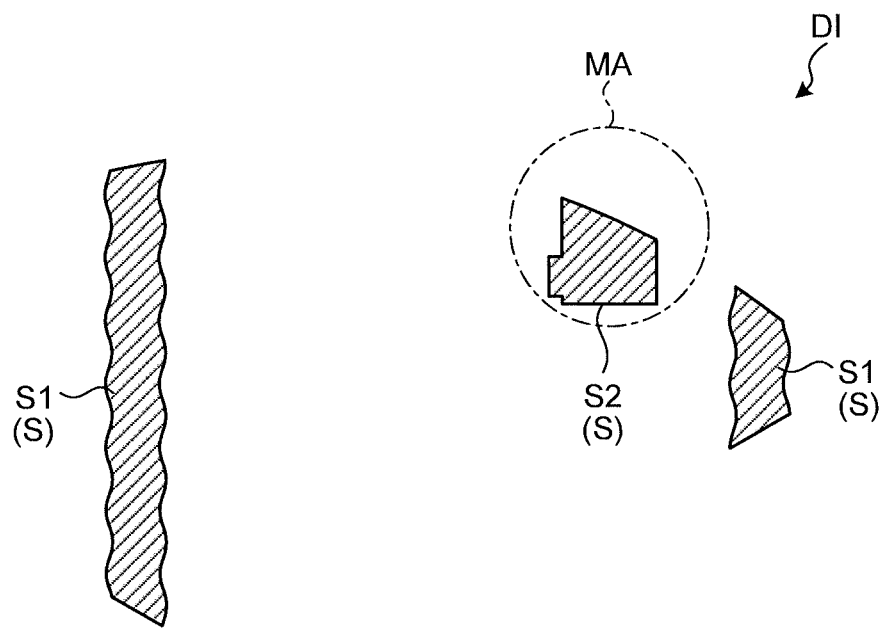
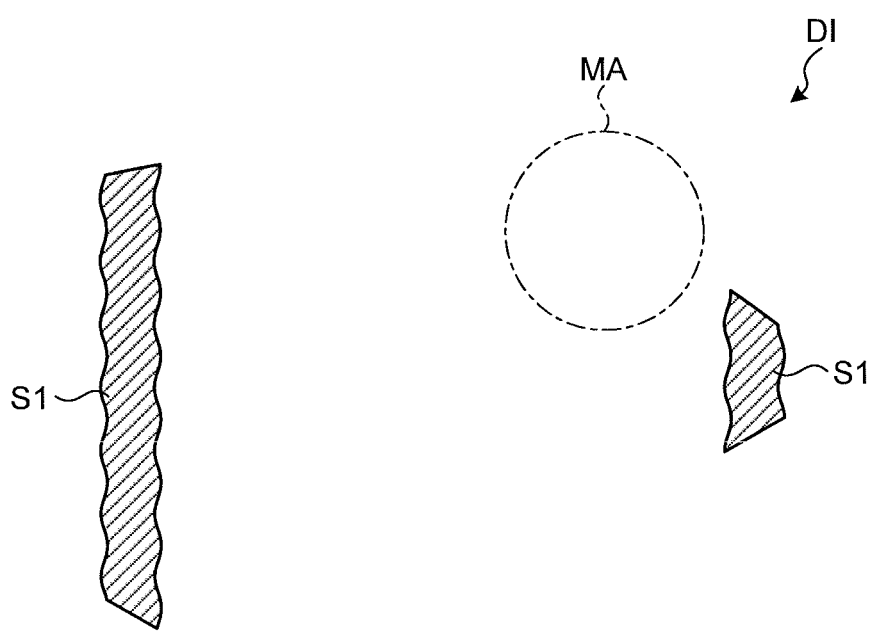

WORK MACHINE CONTROL SYSTEM, WORK MACHINE, AND WORK MACHINE MANAGEMENT SYSTEM

FIELD

The present invention relates to a work machine control system, a work machine, and a work machine management system.

BACKGROUND

In a mining site in a mine, work machines such as a dump truck disclosed in Patent Literature 1 operate.

CITATION LIST

Patent Literature

Patent Literature 1: Japanese Laid-open Patent Publication No. 11-242520

SUMMARY

Technical Problem

In some cases, when an abnormality occurs in the ionosphere, a work machine that autonomously travels on a travel route in a mine might be stopped from operating due to decreased accuracy of a position detected using a global navigation satellite system. As a result, this might decrease productivity in the mine.

An object of the present invention to provide a work machine control system, a work machine, and a work machine management system capable of suppressing a decrease in productivity in a mine.

Solution to Problem

According to a first aspect of the present invention, a work machine control system configured to control a work machine that travels in an operation region, the work machine control system comprises: a position detection unit configured to detect a position of the work machine; a non-contact sensor configured to detect a position of an object around the work machine; and a control unit configured to extract information on an object to be detected from a detection result of the position detection unit and a detection result of the non-contact sensor and configured to exclude moving object information that is information on an object to be detected regarding a moving object that moves in the operation region, from the information on an object to be detected.

According to a second aspect of the present invention, a work machine includes a work machine main body that travels on a travel route in a mine and the work machine control system according to the first aspect of the present invention.

According to a third aspect of the present invention, a work machine management system comprises: the work machine according to the second aspect of the present invention; and a management facility provided in a mine and configured to transmit moving object position information regarding a position of the moving object, wherein the work machine control system receives the moving object position information, estimates a travel position of the moving object based on the received moving object position information, sets a mask region including the moving object at an estimated position, and determines the information on an object to be detected within the mask region as the moving object information.

Advantageous Effects of Invention

According to the present invention, it is possible to suppress a decrease in productivity in a mine.

BRIEF DESCRIPTION OF DRAWINGS

FIG. 7 is a diagram illustrating a portion of map information stored in a map storage database of the work machine control system according to the first embodiment.

FIG. 8 is an enlarged diagram of a section XIV in FIG. 7.

FIG. 15 is a diagram illustrating exemplary detected information.

FIG. 16 is a diagram illustrating exemplary detected information.

DESCRIPTION OF EMBODIMENTS

Hereinafter, an embodiment of the present invention will be described with reference to the drawings. The present invention is not limited by the present embodiment. In addition, components in the following embodiment include components that a person skilled in the art can easily replace, or that are substantially identical.

<Outline of Work Machine Management System>

Figure 1:
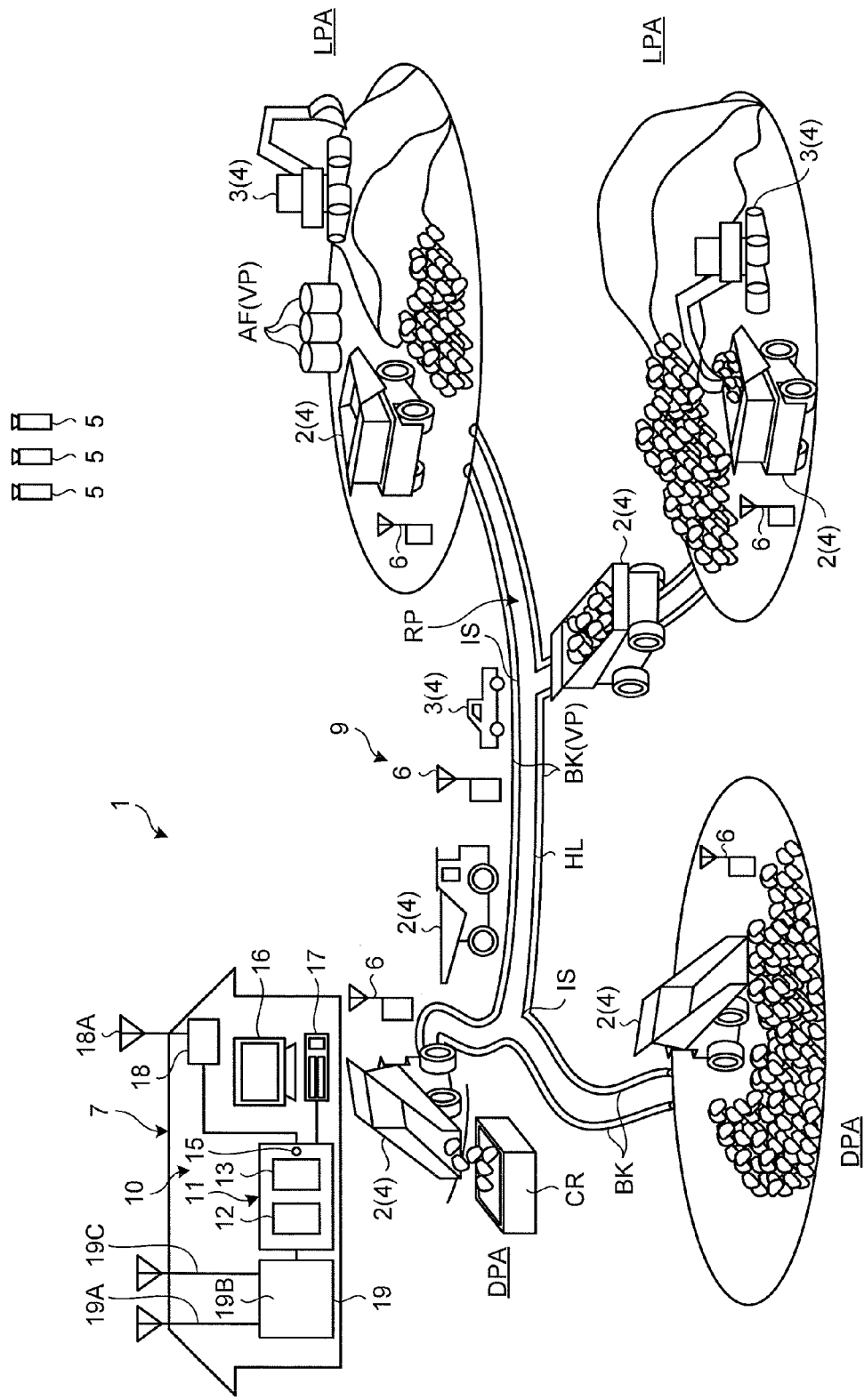
FIG. 1 is an exemplary work machine management system according to a first embodiment.
Figure 2:
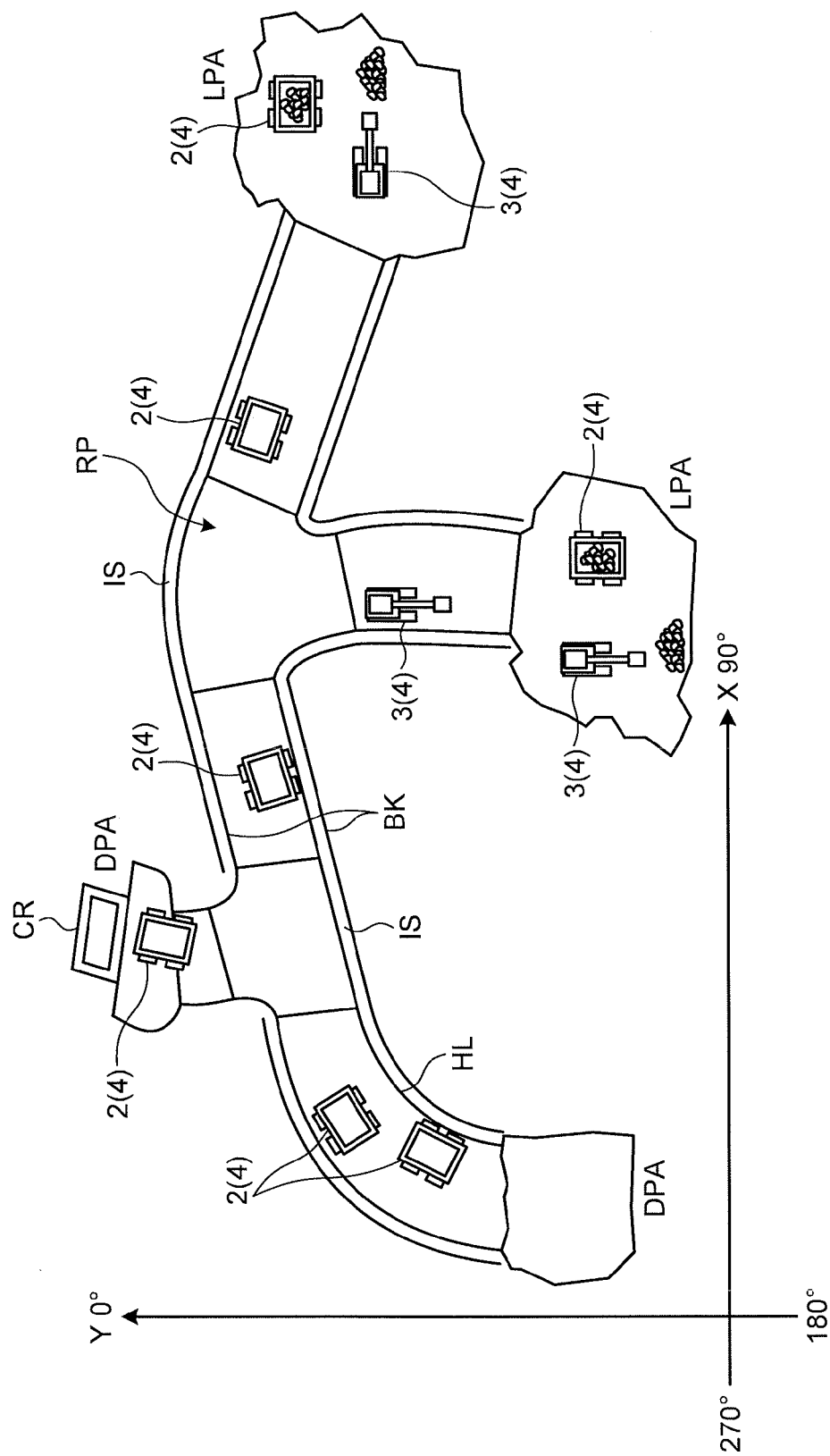
FIG. 2 is a plan view illustrating an exemplary mine to which the work machine management system according to the first embodiment is applied.

FIG. 1 is an exemplary work machine management system according to the present embodiment. FIG. 2 is a plan view illustrating an exemplary mine to which the work machine management system according to the present embodiment and a work machine management system 1 are applied.

The work machine management system 1 (hereinafter, referred to as a management system) performs work machine management. The work machine management includes at least one of work machine operation management, work machine productivity evaluation, operation skill evaluation of work machine operators, maintenance of work machines, and work machine failure diagnosis.

The work machine represents machinery used for various operation in a mine. The work machine includes at least one of a boring machine, an excavating machine, a loading machine, a transport machine, a crushing machine, and a vehicle driven by an operator. The excavating machine can excavate a mine. The loading machine can load a load onto the transport machine. The loading machine includes at least one of an excavator, an electric shovel, and a wheel loader. The transport machine includes a moving object that can move in a mine and transport a load. The transport machine includes a dump truck. The load includes at least one of soil or ore generated by mining. The crushing machine crushes dumped soil casted from the transport machine.

An example in which the transport machine as a work machine that travels in a mine is managed by the management system 1, and an example in which a dump truck 2 as a work machine is controlled by the management system 1, according to the present embodiment, will be described. The dump truck 2, as illustrated in FIGS. 1 and 2, operates in a mine at at least one of a loading location LPA, a dumping location DPA, a transportation path HL leading to at least one of the loading location LPA and the dumping location DPA, and an intersection IS at which the transportation paths HL intersect each other. In some cases, a crushing machine CR that crushes the dumped soil is arranged at at least one of the dumping locations DPA. In a mine, a bank BK formed with piled-up soil is provided on at least one of the outside of the loading location LPA, the outside of the dumping location DPA, and the outside of the transportation path HL.

The dump truck 2 is a moving object that can move in a mine. The dump truck 2 can travel on at least one of the loading location LPA, the dumping location DPA, the transportation path HL, and the intersection IS. That is, a travel route RP of the dump truck 2, provided in a mine, includes at least one of the loading location LPA, the dumping location DPA, the transportation path HL, and the intersection IS. A mine is provided with an upwardly protruding object VP protruding upwardly from a surface of an operation region of the dump truck 2 by a predetermined height or more. According to the first embodiment, the upwardly protruding object VP is formed with a bank BK provided outside of the travel route RP, an artificial object AF installed in at least one of the loading location LPA, the dumping location DPA, and the transportation path HL, and a wall WL installed in at least one of the loading location LPA, the dumping location DPA, and the transportation path HL. In addition to this, an artificial object such as a sign and a building, and a rock, may be included in the upwardly protruding object VP. The predetermined height is a height at which it is undesirable for the dump truck 2 to run over the upwardly protruding object VP at a time of autonomous travel.

A load is loaded onto the dump truck 2 at the loading location LPA. The dump truck 2 unloads (dumps) the load at the dumping location DPA. The dump truck 2 casts dumped soil as a load into the crushing machine CR at the dumping location DPA provided with the crushing machine CR. The dump truck 2 is an unmanned dump truck that normally travels autonomously during operation time of a mine on the travel route RP according to a command signal from a management device 10. Autonomous travel of the dump truck 2 means that the dump truck 2 travels according to the command signal from the management device 10, not by operation of an operator. Alternatively, the dump truck 2 can also travel by operation of the operator (driver).

As illustrated in FIG. 1, the management system 1 includes the management device 10, a communication system 9, the dump truck 2, and other work machine 3. The management device 10 is arranged in a management facility 7 installed in a mine. The management device 10 is installed in the management facility 7 in a mine and does not move. Alternatively, the management device 10 may be configured to be movable. The communication system 9 transmits information among the management device 10, the dump truck 2, and the other work machine 3 by wireless communication. The communication system 9 enables two-way wireless communication between the management device 10 and the dump truck 2, between the management device 10 and the other work machine 3, and between the dump truck 2 the other work machine 3. According to the present embodiment, the communication system 9 includes a plurality of relays 6 that relays signals (radio waves). According to the present embodiment, a position of the dump truck 2 and a position of the other work machine 3 are detected by using a real time kinematic-global navigation satellite system (RTK-GNSS). An exemplary global navigation satellite system includes a global positioning system (GPS). The configuration, however, is not limited to this. The RTK-GNSS includes a plurality of positioning satellites 5. The RTK-GNSS detects a position in a coordinate system (global coordinate system) that defines longitude, latitude, and altitude. The position detected by the RTK-GNSS includes coordinate information of longitude, latitude, and altitude. The RTK-GNSS is used to detect a position of the dump truck 2 and a position of the other work machine 3, in the mine. The position detected by the RTK-GNSS is an absolute position defined in the global coordinate system. In the description below, the position detected by the RTK-GNSS will be referred to as a GPS position, as appropriate. The GPS position is an absolute position and coordinate information (coordinate value) of longitude, latitude, and altitude. In the RTK-GNSS, positioning modes change according to influences from arrangement of the positioning satellite 5, the ionosphere, the troposphere, or terrain around an antenna that receives information from the positioning satellite 5. The positioning modes include a fixed solution (accuracy: approximately ±1 cm to 2 cm), a float solution (accuracy: approximately ±10 cm to several meters), a single-point positioning solution (accuracy: approximately ±several meters), and non-positioning (positioning calculation not possible).

Moreover, the management system 1 manages the positions of the dump truck 2 and the other work machine 3, in a mine, by a coordinate system defined by the X-axis direction and the Y-axis direction orthogonal to each other (hereinafter, referred to as the X-Y coordinates) as illustrated in FIG. 2. The management system 1 also manages the azimuth of the dump truck 2 and the other work machine 3 as north: 0°, east: 90°, south: 180°, and west: 270°. The azimuth of each of the dump truck 2 and the other work machine 3 is defined as a direction in which each of the dump truck 2 and the other work machine 3 moves when traveling forwardly. Note that, although the Y-axis direction indicates north in the present embodiment. The configuration, however, is not limited to this.

<Management Device>

Next, the management device 10 arranged in the management facility 7 will be described. The management device 10 transmits travel route information that is information to specify the travel route RP provided in a mine, to a work machine control system 30 of the dump truck 2 and includes, as illustrated in FIG. 1, a computer 11, a display device 16, an input device 17, a wireless communication device 18, and a GPS base station 19.

The computer 11 includes a processing device 12, a storage device 13, and an input/output unit 15. Each of the display device 16, the input device 17, the wireless communication device 18, and the GPS base station 19 is connected to the computer 11 via the input/output unit 15. The input/output unit 15 is used for performing input/output (interface) of information with at least one of the processing device 12, the display device 16, the input device 17, the wireless communication device 18, and the GPS base station 19.

The processing device 12 executes various types of processing related to management of the dump truck 2 and various types of processing related to management of the other work machine 3. The processing device 12 processes information regarding the position of the dump truck 2 and information regarding the position of the other work machine 3, obtained via the communication system 9. The processing device 12 generates travel route information on the dump truck 2. The storage device 13 is connected with the processing device 12. The storage device 13 stores various types of information regarding management of the dump truck 2 and various types of information regarding management of the other work machine 3. The storage device 13 stores a position of the dump truck 2 and a position of the other work machine 3. The storage device 13 stores a computer program that causes the processing device 12 to execute various types of processing.

The display device 16 includes a flat panel display such as a liquid crystal display. The display device 16 can display information regarding the position of the dump truck 2 and information regarding the position of the other work machine 3. The input device 17 includes at least one of a keyboard, a touch panel, and a mouse. The input device 17 functions as an operation unit that can be used to input an operation signal into the processing device 12.

The wireless communication device 18 is arranged in the management facility 7. The wireless communication device 18 is a portion of the communication system 9. The wireless communication device 18 is connected with the processing device 12 via the input/output unit 15. The wireless communication device 18 includes an antenna 18A. The wireless communication device 18 can receive information transmitted from at least one of the dump truck 2 and the other work machine 3. The information received by the wireless communication device 18 is output to the processing device 12 and stored (registered) in the storage device 13. The wireless communication device 18 can transmit information to at least one of the dump truck 2 and the other work machine 3. The wireless communication device 18 can transmit position information on a moving object (moving object position information) of each of the dump truck 2 and the other work machine 3. The moving object position information includes, for example, coordinate information regarding the above-described X-coordinate and Y-coordinate.

The GPS base station 19 is arranged in the management facility 7. The GPS base station 19 includes at least an antenna 19A that receives information from the plurality of positioning satellites 5 and a transmission/reception device 19B connected to the antenna 19A. The transmission/reception device 19B includes at least a receiver that receives information from the positioning satellite 5 via the antenna 19A, a transmitter that transmits information to the dump truck 2 via an antenna 19C, a calculation processing device including a microprocessor such as a central processing unit (CPU), and a storage device including a memory such as a read only memory (ROM) or a random access memory (RAM). The transmission/reception device 19B detects the GPS position of the GPS base station 19 based on the information received by the antenna 19A, and together with this, generates correction observation information use to correct the GPS position of the dump truck 2. At the GPS base station 19, the transmission/reception device 19B transmits correction observation information to the dump truck 2 and the other work machine 3 via the antenna 19C. Alternatively, the GPS base station 19 may transmit the correction observation information via the antenna 18A instead of the antenna 19C.

The computer 11 includes at least the input/output unit 15 for communication, a central processing unit (CPU) that executes a control program, a read only memory (ROM) that stores a control program, a random access memory (RAM) used for CPU operation region, and a nonvolatile memory on which information is registered by the CPU. Functions of the processing device 12 are implemented by procedures executed by the CPU of reading a control program stored in the ROM and executing the control program in the operation region of the RAM. Functions of the storage device 13 are implemented by procedures by the ROM of storing the control program and procedures by the CPU of registering information on the nonvolatile memory. The nonvolatile memory includes at least one of a flash memory and a hard disk drive and is used to implement a database 13B. It is possible to configure such that a plurality of processing circuits works in cooperation to implement functions of the processing device 12 and the storage device 13.

<Other Work Machine>

Next, the other work machine 3 will be described. According to the present embodiment, the other work machine 3 is a work machine other than the dump truck 2 and operates according to operation of an operator. The other work machine 3 includes at least a processing device that contains a central processing unit (CPU) and executes various types of processing related to operation, a GPS receiver that detects a GPS position, a wireless communication device that exchanges information with the wireless communication device 18 of the management facility 7. On the other work machine 3, the wireless communication device transmits a GPS position, with a predetermined time interval, to the wireless communication device 18 of the management facility 7.

<Dump Truck>

Figure 3:
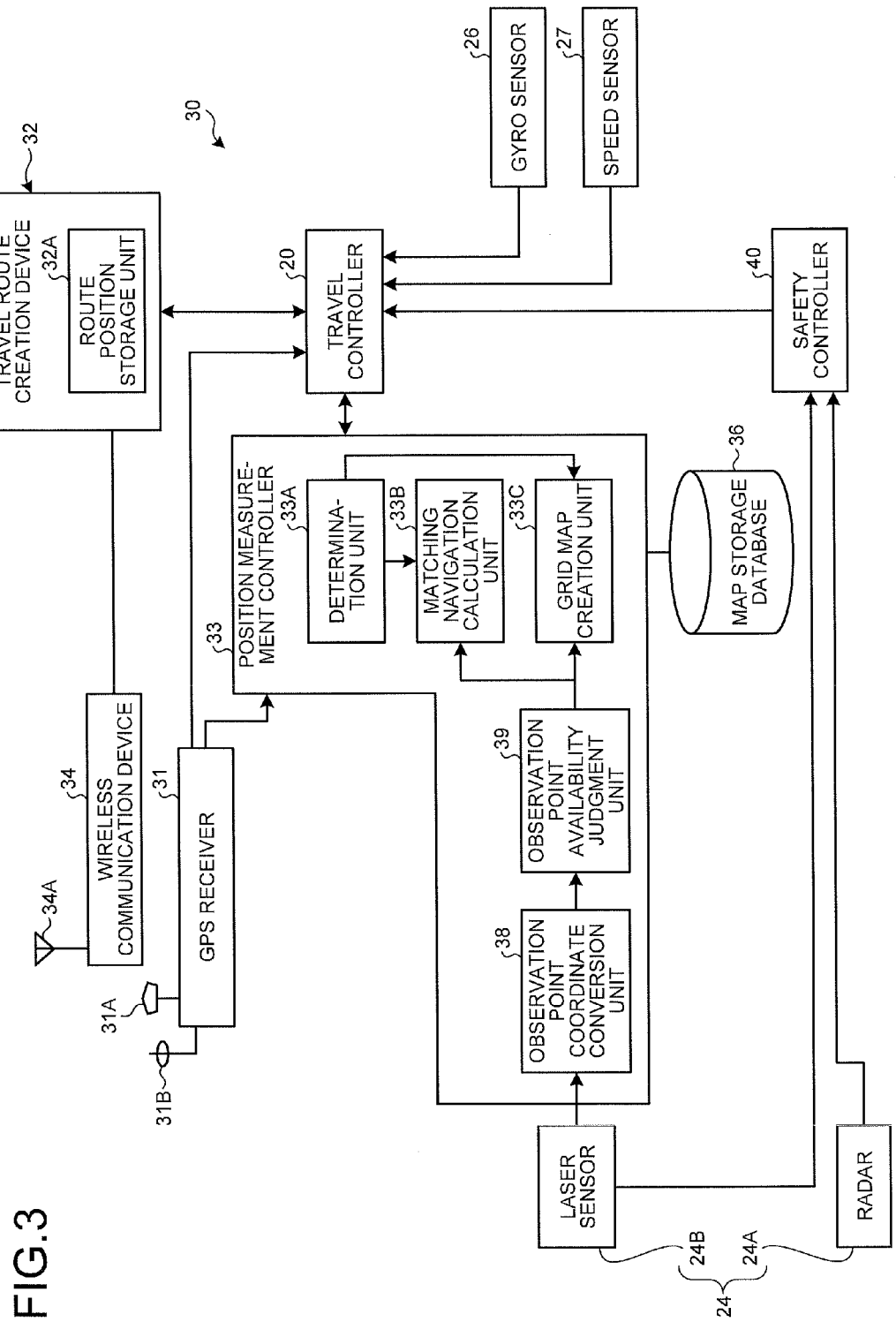
FIG. 3 is a control block diagram of a dump truck according to the first embodiment.
Figure 4:
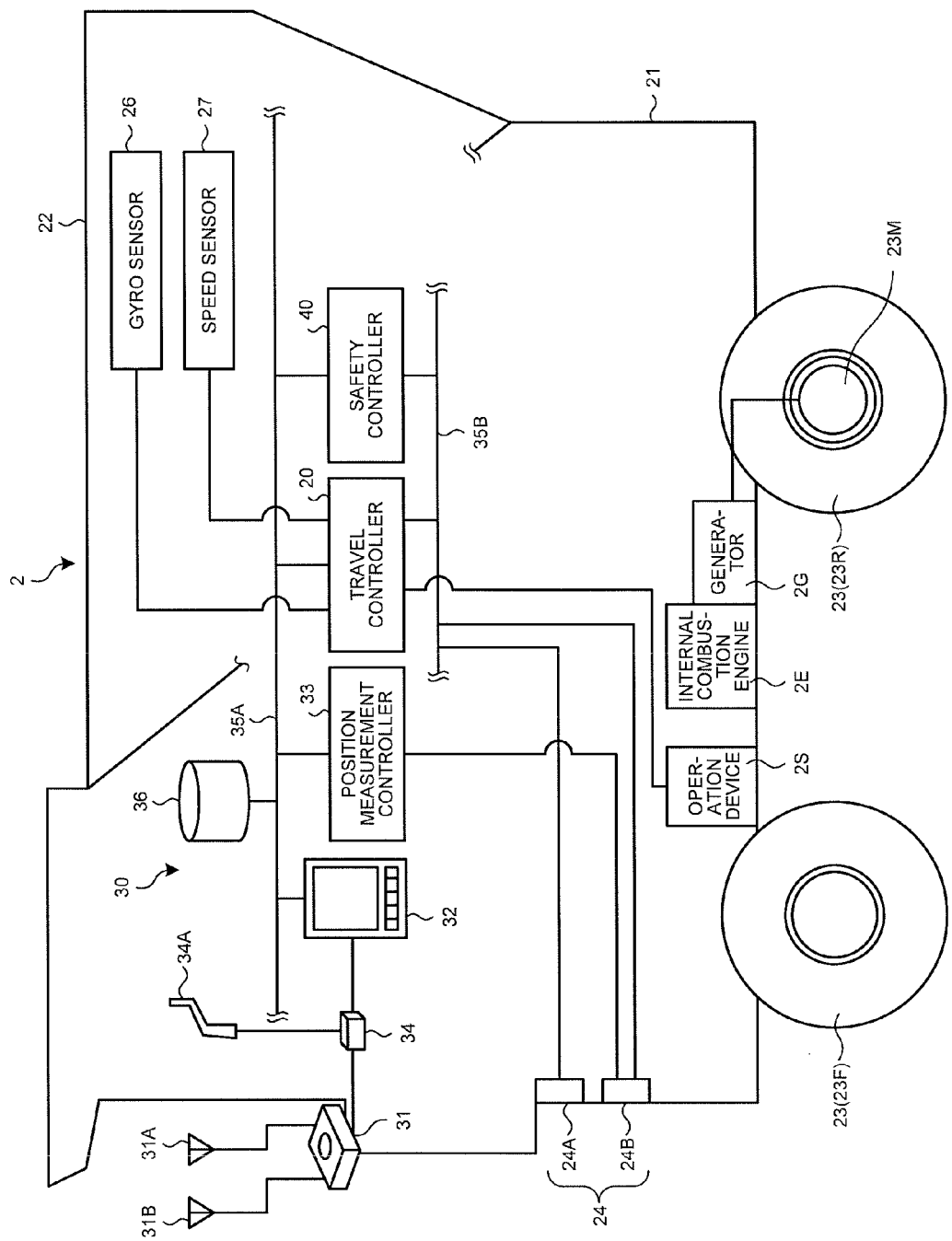
FIG. 4 is a hardware configuration diagram of the dump truck according to the first embodiment.
Figure 5:
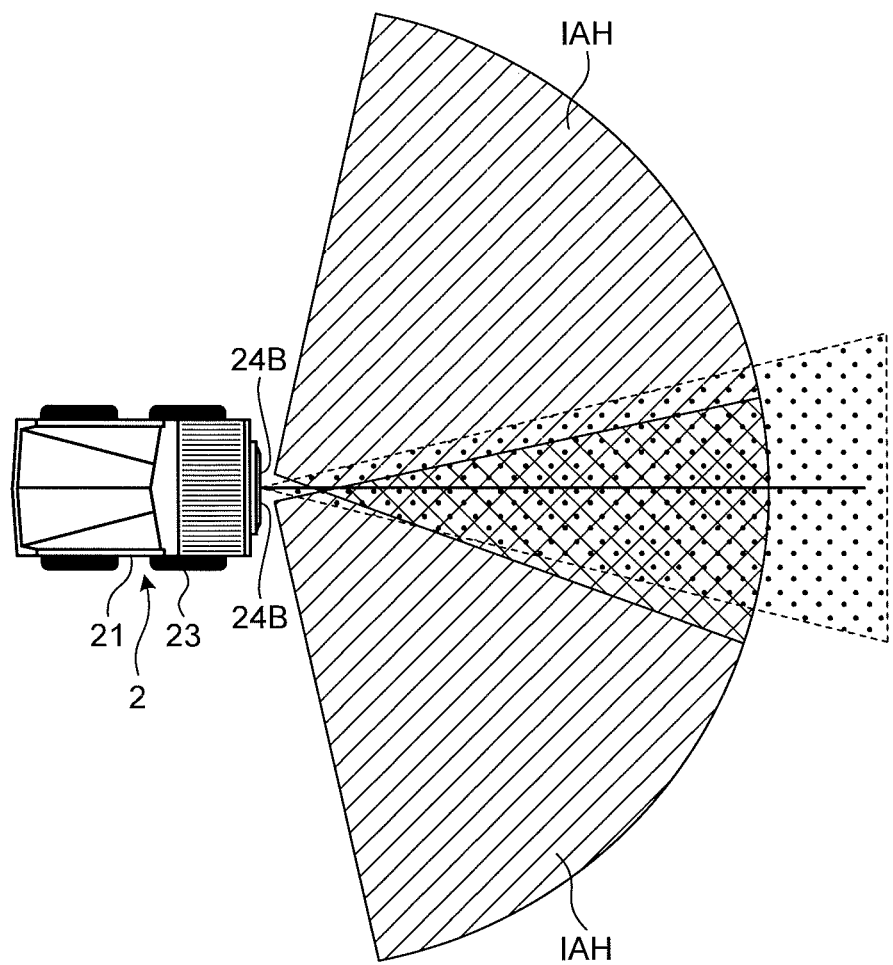
FIG. 5 is a plan view of a laser sensor detection range of an obstacle sensor.

Next, the dump truck 2 will be described. FIG. 3 is a control block diagram of the dump truck according to the present embodiment. FIG. 4 is a hardware configuration diagram of the dump truck according to the present embodiment. FIG. 5 is a plan view of a detection range of a laser sensor of an obstacle sensor.

As illustrated in FIG. 4, the dump truck 2 includes a vehicle main body 21, a vessel 22, a wheel 23, an obstacle sensor 24, and the work machine control system 30. The vehicle main body 21 travels on an operation region including the travel route RP. The operation region is a region that includes the transportation path HL, the loading location LPA, the dumping location DPA, and the intersection. The dump truck 2 passes through the operation region when it travels and performs operation. In the vehicle main body 21, an internal combustion engine 2E similar to a diesel engine, a generator 2G activated by the internal combustion engine 2E, an electric motor 23M activated by power generated by the generator are arranged. The electric motor 23M drives a rear wheel 23R of the wheel 23. It is possible to configure such that power of the internal combustion engine 2E is transmitted to the rear wheel 23R via a transmission including a torque converter. The vehicle main body 21 includes an operation device 2S that steers a front wheel 23F of the wheel 23. A load is loaded onto the vessel 22 by a loading machine. At dumping operation, the vessel 22 is raised to dump the load.

The obstacle sensor 24 is arranged at a lower front portion of the vehicle main body 21. The obstacle sensor 24 executes non-contact detection of an obstacle in front of the vehicle main body 21. According to the present embodiment, the obstacle sensor 24 includes a plurality of radars 24A, and a laser sensor 24B as a non-contact sensor. The radar 24A emits a radio wave to be projected toward an obstacle, and then, receives a radio wave reflected from the obstacle. With this function, the radar 24A can detect a direction and distance of the obstacle with respect to the radar 24A. According to the present embodiment, two laser sensors 24B are provided with an interval therebetween in a lateral direction of the vehicle main body 21. The configuration, however, is not limited to this.

The laser sensor 24B detects a position of an object around the dump truck 2. The laser sensor 24B emits a laser beam to be projected toward an obstacle, namely, an object, and receives a laser beam reflected from the obstacle. With this configuration, the laser sensor 24B can detect a direction and distance of the obstacle with respect to the laser sensor 24B. The laser sensor 24B emits a laser beam and receives a reflected laser beam. Accordingly, the resolution of the laser sensor 24B is higher than the resolution of the radar 24A. According to the present embodiment, two laser sensors 24B are provided with an interval therebetween in a lateral direction of the vehicle main body 21. The arrangement, however, is not limited to this.

Each of the radar 24A and the laser sensor 24B is connected to a second communication line 35B of the work machine control system 30. The laser sensor 24B is connected to a position measurement controller 33 of the work machine control system 30.

<Work Machine Control System>

Figure 6:
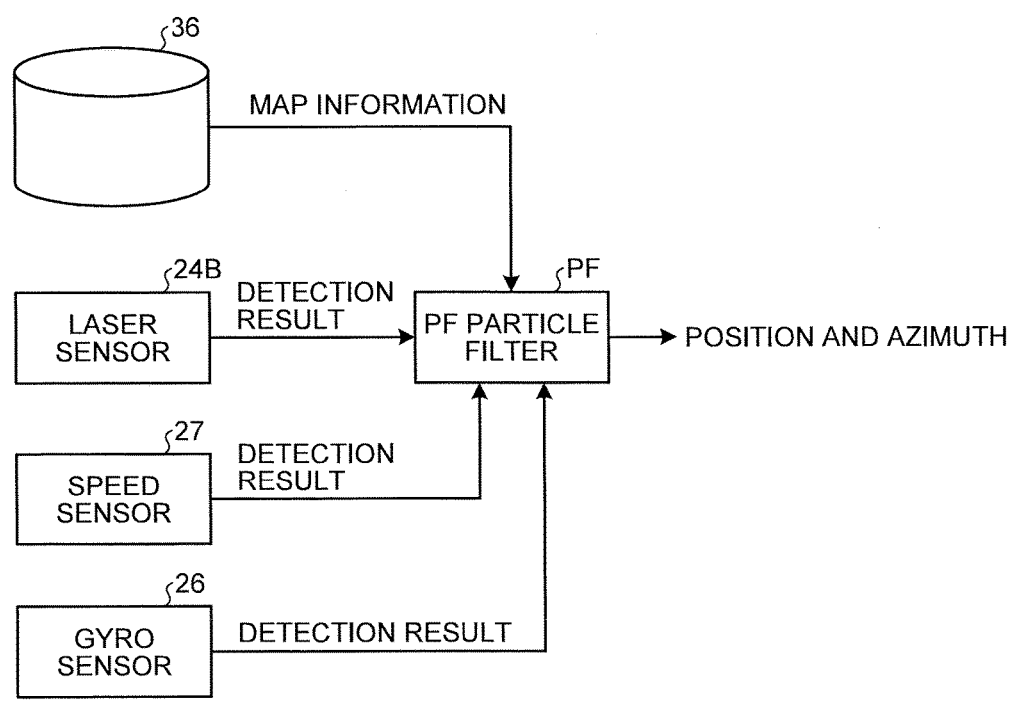
FIG. 6 is a diagram illustrating a method of detecting a position and an azimuth by a matching navigation position calculation unit of a position measurement controller of a work machine control system according to the first embodiment.

Next, the work machine control system will be described. FIG. 6 is a diagram illustrating a method of detecting a position and an azimuth by a matching navigation position calculation unit of a position measurement controller of a work machine control system according to the present embodiment. FIG. 7 is a diagram illustrating a portion of map information stored in a map storage database of the work machine control system according to the present embodiment. FIG. 8 is an enlarged diagram of a section XIV in FIG. 7.

The work machine control system 30 is a system installed on the dump truck 2 and causes the dump truck 2 to autonomously travel along the travel route RP. As illustrated in FIG. 4, the work machine control system 30 includes at least a gyro sensor 26, a speed sensor 27, a GPS receiver 31, a travel route creation device 32, the position measurement controller 33, the travel controller 20, the laser sensor 24B, a wireless communication device 34, and a map storage database 36. Additionally, the work machine control system 30 includes a first communication line 35A, the second communication line 35B, and a safety controller 40.

As illustrated in FIG. 4, each of the travel controller 20, the travel route creation device 32, the position measurement controller 33, the map storage database 36, and the safety controller 40 is connected to the first communication line 35A. These communicate with each other to exchange information via a first communication line 35. The travel controller 20 and the safety controller 40 are also connected to the second communication line 35B. These communicate with each other to exchange information via the second communication line 35B. According to the first embodiment, a communication standard using the first communication line 35A and the second communication line 35B is a controller area network (CAN) standardized as ISO11898 and ISO11519. The configuration, however, is not limited to this.

The gyro sensor 26 detects the azimuth (change amount of azimuth) of the dump truck 2. The gyro sensor 26 is connected with the travel controller 20. The gyro sensor 26 outputs a detection signal as a detection result to the travel controller 20. The travel controller 20 can obtain the azimuth (change amount of azimuth) of the dump truck 2 based on the detection signal of the gyro sensor 26.

The speed sensor 27 detects a travel speed of the dump truck 2. According to the present embodiment, the speed sensor 27 detects a rotational speed of the wheel 23 to detect a speed (travel speed) of the dump truck 2. The speed sensor 27 is connected with the travel controller 20. The speed sensor 27 outputs a detection signal as a detection result to the travel controller 20. The travel controller 20 can obtain a moving distance of the dump truck 2 based on the detection signal of the speed sensor 27, and time information from a timer built in the travel controller 20.

The GPS receiver 31 is a position detection unit to detect a GPS position as a position of the dump truck 2 by using a GPS. The GPS receiver 31 is connected at least with an antenna 31A that receives information from the positioning satellite 5 and an antenna 31B that receives correction observation information from the GPS base station 19. The antenna 31A outputs a signal based on the information received from the positioning satellite 5 to the GPS receiver 31, and the antenna 31B outputs a signal based on the received correction observation information to the GPS receiver 31. The GPS receiver 31 detects a position of the antenna 31A (GPS position) using information from the positioning satellite 5 and using the correction observation information from the GPS base station 19. Specifically, the GPS receiver 31 compares the information from the positioning satellite 5 with the correction observation information from the GPS base station 19 to obtain a distance to any of the positioning satellites 5, and further examines a phase of a radio wave from the positioning satellite 5 to detect the position (GPS position) of the antenna 31A. According to the present embodiment, the GPS receiver 31 uses a real time kinematic (RTK)-GNSS. The configuration, however, is not limited to this.

The GPS receiver 31 detects the position of the dump truck 2 (GPS position) by detecting the position of the antenna 31A (GPS position). Furthermore, in a process of detecting the position of the antenna 31A, the GPS receiver 31 detects a fixed solution, a float solution, or a single-point positioning solution, each indicating accuracy of the detected GPS position, based on the number of positioning satellites 5, or the like, from which the antenna 31A has received information. In a case where positioning calculation of the GPS position is not possible, the GPS receiver 31 outputs a signal indicating non-positioning. According to the present embodiment, the accuracy of the GPS position by the fixed solution is accuracy by which the dump truck 2 can perform autonomous travel. The accuracies of the GPS positions by the float solution and by the single-point positioning solution are accuracies with which the dump truck 2 cannot perform autonomous travel. The configuration, however, is not limited to this. In this manner, the GPS receiver 31 detects a fixed solution, a float solution, or a single-point positioning solution, indicating accuracies of the detected GPS position, and in a case where it is not possible to execute positioning calculation, outputs a signal indicating non-positioning, to the travel controller 20 and the position measurement controller 33 via the travel route creation device 32.

The travel route creation device 32, as illustrated in FIG. 3, includes a route position storage unit 32A as a route position storage means for storing travel route information generated by the processing device 12 of the management device 10. The travel route creation device 32 is connected with the wireless communication device 34 connected with an antenna 34A. The wireless communication device 34 can receive information (including command signal) transmitted from at least one of the management device 10 and a work machine 4 other than the own vehicle. The work machine 4 other than the own vehicle 4 is the work machine 4 other than the dump truck 2 on which the work machine control system 30 is installed, and includes a boring machine, an excavating machine, a loading machine, a transport machine, and a vehicle driven by an operator. That is, the work machine 4 other than the own vehicle includes a dump truck 2 other than the own vehicle.

The wireless communication device 34 receives the travel route information and information regarding the position of the work machine 4 other than the own vehicle, transmitted by the wireless communication device 18 of the management facility 7, and outputs the information to the travel route creation device 32 and the position measurement controller 33. Note that the travel route information and the information regarding the position of the work machine 4 other than the own vehicle are displayed on the X-Y coordinates. The travel route creation device 32, after receiving the travel route information and the information regarding the position of the work machine 4 other than the own vehicle from the wireless communication device 34, stores the information in the route position storage unit 32A. The travel route creation device 32, after receiving the travel route information and the information regarding the position of the work machine 4 other than the own vehicle, from the wireless communication device 34, transmits the position and azimuth of the dump truck 2 as the own vehicle, to the wireless communication device 18 of the management facility 7 via the wireless communication device 34. The travel route creation device 32 is connected to the first communication line 35A.

The travel controller 20 is a computer including at least a central processing unit (CPU), a read only memory (ROM) that stores a control program, a random access memory (RAM) used as a CPU operation region, and a nonvolatile memory. The travel controller 20 receives the GPS position detected by the GPS receiver 31 and the position of the dump truck 2 detected by the position measurement controller 33. The travel controller 20 is a travel control unit that causes the dump truck 2 to autonomously travel along the travel route RP based on the GPS position of the dump truck 2 detected by the GPS receiver 31 or the position of the dump truck 2 detected by a matching navigation position calculation unit 33B of the position measurement controller 33.

Other than the position of the dump truck 2, a detection signal indicating the azimuth (change amount of azimuth) of the dump truck 2, which is a detection result of the gyro sensor 26, and a detection signal indicating the travel speed of the dump truck 2, which is a detection result of the speed sensor 27, are input into the travel controller 20. According to the first embodiment, the detection signal indicating the azimuth (change amount of azimuth) of the dump truck 2 and the detection signal indicating the travel speed of the dump truck 2, which is a detection result of the speed sensor 27, are input into the travel controller 20 with an interval of T1. The travel controller 20 is connected with the GPS receiver 31 via the wireless communication device 34, the travel route creation device 32, and the first communication line 35A. A detection signal indicating a GPS position, which is a detection result of the GPS receiver 31, is input into the travel controller 20. According to the first embodiment, a detection signal indicating a GPS position is input into the travel controller 20 with an interval of T2 that is longer than T1.

The travel controller 20 performs identification operation to identify the position and azimuth of the dump truck 2 based on the GPS position as a detection result of the GPS receiver 31, the travel speed of the dump truck 2 as a detection result of the speed sensor 27, and the azimuth (change amount of azimuth) of the dump truck 2 as a detection result of the gyro sensor 26. According to the first embodiment, the travel controller 20 integrates, using the Kalman filter (KF), the GPS position as a detection result of the GPS receiver 31, the travel speed of the dump truck 2 as a detection result of the speed sensor 27, and the azimuth (change amount of azimuth) of the dump truck 2 as a detection result of the gyro sensor 26 so as to identify the position and azimuth of the dump truck 2. Specifically, the travel controller 20 uses the GPS position at the time of GPS position input from the GPS receiver 31 and the azimuth, which is a detection result of the gyro sensor 26, as a basis and integrates the travel speed, which is a detection result of the speed sensor 27, by time information from the timer so as to identify the position and the azimuth. The travel controller 20 converts the GPS position into a position on the X-Y coordinates at any of the timings of before detection, during detection, and after detection of the position and the azimuth.

The travel controller 20 controls at least one of an accelerator, a braking device, and the operation device 2S of the dump truck 2 such that the position of the dump truck 2 overlaps with the position of the travel route RP included in the travel route information, that is, such that the dump truck 2 travels along the travel route RP. With this control, the travel controller 20 causes the dump truck 2 to travel along the travel route RP. Functions of the travel controller 20 are implemented when the CPU reads a control program stored in the ROM and executes in the operation region in the RAM. It is possible to configure such that a plurality of processing circuits operates in cooperation to implement functions of the travel controller 20.

The position measurement controller 33, as illustrated in FIG. 3, includes a determination unit 33A, the matching navigation position calculation unit 33B, and a grid map creation unit 33C. The position measurement controller 33 is a measurement output unit that, when the dump truck 2 travels along the travel route RP, detects the position of the upwardly protruding object VP (mainly the bank BK according to the first embodiment) from the GPS position of the dump truck 2, which is the detection result of the GPS receiver 31, and from the detection result of the laser sensor 24B, and stores the presence/absence and the position of the detected upwardly protruding object VP into the map storage database 36 as map information MI of the operation region including the travel route RP. The position measurement controller 33 is connected to the first communication line 35. A detection signal indicating the azimuth (change amount of azimuth) of the dump truck 2, which is a detection result of the gyro sensor 26, and a detection signal indicating the travel speed of the dump truck 2, which is a detection result of the speed sensor 27, are input into the position measurement controller 33 via the first communication line 35 and the travel controller 20.

The position measurement controller 33 is connected with the GPS receiver 31 via the wireless communication device 34, the travel route creation device 32, and the first communication line 35A. A detection signal indicating a GPS position, which is a detection result of the GPS receiver 31, is input into the position measurement controller 33.

The determination unit 33A is a determination means that determines whether GPS positional accuracy detected by the GPS receiver 31 is above a predetermined accuracy (namely, whether it is high accuracy). According to the present embodiment, the determination unit 33A determines whether the solution of the GPS position is a fixed solution. In a case where the solution of the GPS position is a fixed solution, the determination unit 33A determines that the detected GPS positional accuracy of the dump truck 2 is high. In a case where the solution of the GPS position is a float solution, single-point positioning solution, or where the GPS position indicates non-positioning, the determination unit 33A determines that the detected GPS positional accuracy of the dump truck 2 is low. Note that the predetermined accuracy is a GPS positional accuracy that enables autonomous travel of the dump truck 2 along the travel route RP according to dead-reckoning navigation to be described below. According to the present embodiment, the GPS receiver 31 detects GPS position and solution. However, detection of the solution may be performed by another device (determination unit 33A, for example).

The grid map creation unit 33C creates map information of the operation region. The grid map creation unit 33C creates the above-described map information MI in a case where, for example, the determination unit 33A determines that the GPS positional accuracy of the dump truck 2 detected by the GPS receiver 31 is above a predetermined accuracy (namely, high accuracy).

The grid map creation unit 33C first executes extraction operation to extract the position of the upwardly protruding object VP from detected information detected by the laser sensor 24B. When executing the extraction operation, the grid map creation unit 33C first integrates the position and azimuth of the dump truck 2, detected by the determination unit 33A, with the detected information detected by the laser sensor 24B. Subsequently, a detection result for other than the upwardly protruding object VP is deleted so as to extract information on an object to be detected of the upwardly protruding object VP.

The grid map creation unit 33C executes map information generation operation based on the information on an object to be detected extracted in the above-described manner. When executing the generation operation, the grid map creation unit 33C stores, for example, the above-described information on an object to be detected into the map storage database 36 as map information MI of the operation region.

As illustrated in FIG. 7, the map information MI indicates the presence/absence and position of the upwardly protruding portion VP, such as a bank BK, in an operation region of a mine in a plan view. As illustrated in FIG. 8, the map information MI is formed of rectangular grid regions GR arranged in a latticed pattern in X and Y directions. Each of the grid regions GR corresponds to a rectangular region of a mine in a plan view. The X coordinate and Y coordinate are set to each of grid regions GR. Each of the grid regions GR includes information of whether the upwardly protruding object VP exists or not, namely, zero or one. In the present embodiment, as illustrated in FIGS. 7 and 8, the grid region GR is indicated in black (1) in a case where the upwardly protruding object VP exists, and the grid region GR is indicated in white (0) in a case where the upwardly protruding portion VP does not exist. The configuration, however, is not limited to this.

The map storage database 36 is a map information storage unit that stores information regarding the position of the upwardly protruding object VP as map information MI of the operation region, and is connected to the first communication line 35A. The map storage database 36 includes at least one of a random access memory (RAM), a read only memory (ROM), a flash memory, and a hard disk drive. When the determination unit 33A determines that the GPS positional accuracy of the dump truck 2 detected by the GPS receiver 31 is above a predetermined accuracy, the map storage database 36 extracts, from the detection result of the laser sensor 24B, a detection result related to the upwardly protruding object VP of the operation region including the travel route RP, and stores the extracted detection result related to the upwardly protruding object VP as map information MI of the operation region. The map storage database 36 stores the detection result detected by the grid map creation unit 33C as map information MI each time the detection is performed by the grid map creation unit 33C. According to the present embodiment, the map information MI stored into the map storage database 36 is overwritten each time the detection is performed by the grid map creation unit 33C. The configuration, however, is not limited to this.

When the determination unit 33A determines that the GPS positional accuracy of the dump truck 2 detected by the GPS receiver 31 is the predetermined accuracy or below, the matching navigation position calculation unit 33B detects the position and azimuth of the dump truck 2 based on the detection result of the gyro sensor 26, the detection result of the speed sensor 27, the detection result of the laser sensor 24B, and the map information MI stored in the map storage database 36. The matching navigation position calculation unit 33B, as illustrated in FIG. 6, integrates the detection result of the gyro sensor 26, the detection result of the speed sensor 27, the detection result of the laser sensor 24B, and the map information MI stored in the map storage database 36 using a particle filter (PF) so as to detect the position and azimuth of the dump truck 2. According to the present embodiment, the matching navigation position calculation unit 33B detects the position and azimuth and outputs them to the travel controller 20. According to the present embodiment, the position and azimuth detected by the matching navigation position calculation unit 33B are input into the travel controller 20 with an interval of T3.

The position measurement controller 33 transmits the information regarding the position and azimuth of the dump truck 2 as the own vehicle, detected by the GPS receiver 31 or the matching navigation position calculation unit 33B, to the wireless communication device 18 of the management facility 7 via the wireless communication device 34.

Furthermore, the position measurement controller 33, as illustrated in FIG. 3, includes an observation point coordinate conversion unit 38 and an observation point availability judgment unit 39. The observation point coordinate conversion unit 38 converts the position as the detection result of the laser sensor 24B, displayed on a coordinate defined by the direction and distance from the laser sensor 24B, into the X-Y coordinates. The position of the detection result in which coordinates have been converted by the observation point coordinate conversion unit 38 is defined by the X-axis direction, the Y-axis direction, and additionally by the height direction (Z-axis direction) orthogonal to the X and Y directions. Information regarding the position of the work machine 4 other than the own vehicle is input from the route position storage unit 32A into the observation point availability judgment unit 39. The observation point availability judgment unit 39 removes various types of noise, a detection result for a predetermined height or less from a earth surface, and a detection result estimated to have detected the work machine 4 other than the own vehicle, from the detection result in which coordinates have been converted by the observation point coordinate conversion unit 38. The observation point availability judgment unit 39 combines the detection result of the laser sensor 24B, from which noise has been removed, with the detection result of the grid region GR. The observation point availability judgment unit 39 outputs the combined detection result to both the grid map creation unit 33C and the matching navigation position calculation unit 33B.

Figure 9:
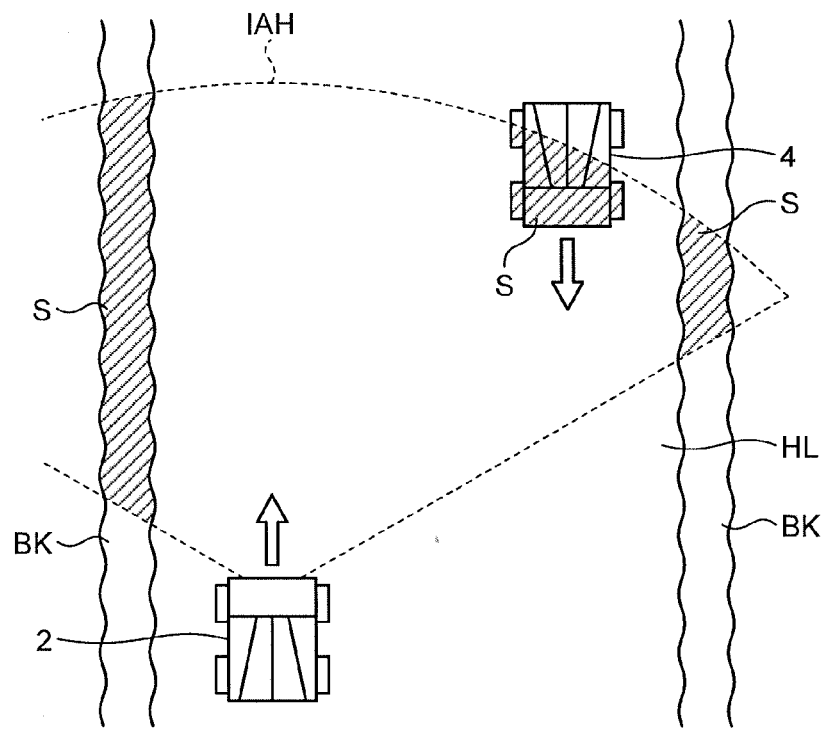
FIG. 9 is a diagram illustrating exemplary detection by a laser sensor.
Figure 10:
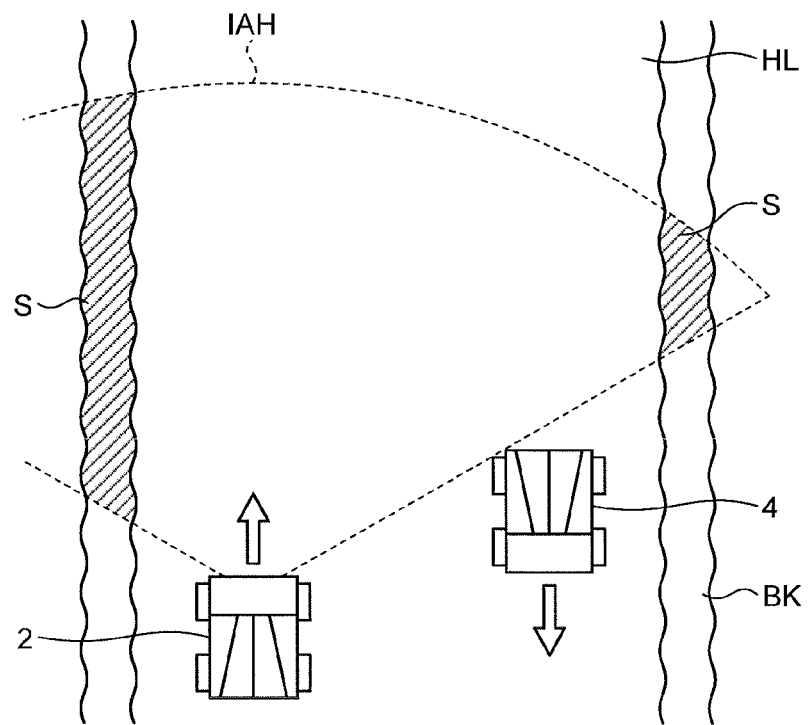
FIG. 10 is a diagram illustrating exemplary detection by a laser sensor.

FIGS. 9 and 10 are diagrams illustrating exemplary detection by the laser sensor 24B. As illustrated in FIG. 9, the dump truck 2 as the own vehicle travels on the transportation path HL while emitting a laser beam to an illumination range IAH. A portion of the bank BK included in the illumination range IAH of the laser beam is detected as a portion S of the upwardly protruding object VP.

Meanwhile, other work machine 4 that is different from the dump truck 2 is traveling as an oncoming vehicle to the dump truck 2. The work machine 4, when it passes the dump truck 2, enters the illumination range IAH of the laser beam as illustrated in FIG. 9. In this case, a portion of the work machine 4 is also detected as a portion S of the upwardly protruding object VP. Subsequently, as illustrated in FIG. 10, the portion of the work machine 4 is continuously detected as the portion S of the upwardly protruding object VP until the work machine 4 goes out of the illumination range IAH of the laser beam.

Figure 11:
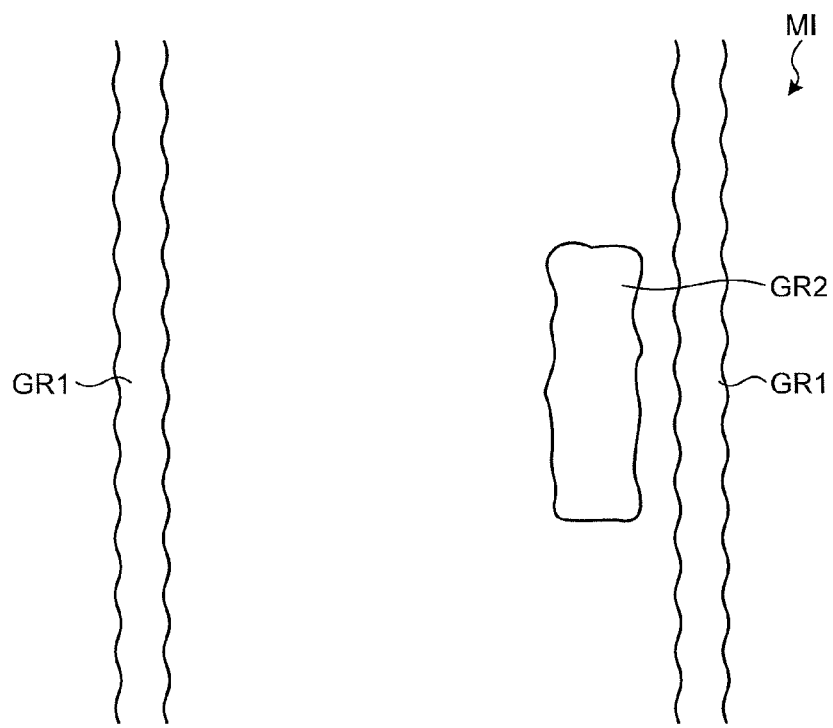
FIG. 11 is a diagram illustrating exemplary map information generated by a detection result.

FIG. 11 is a diagram illustrating exemplary map information generated by the above-described detection result. As illustrated in FIG. 11, the map information MI includes information GR1 on an object to be detected, generated based on the portion S of the upwardly protruding object VP, and information GR2 on an object to be detected, generated based on the portion of the work machine 4 as information MI. Accordingly, the detection result of the work machine 4 that has passed the dump truck 2 is to be included in the map information MI, as a portion of the upwardly protruding object VP. In a case where the matching navigation position calculation unit 33B calculates the position of the dump truck 2 based on the map information MI as above, the upwardly protruding object VP, included in the map information MI, that corresponds to the information GR2 on an object to be detected is not detected in practice. Accordingly, this might decrease accuracy of the calculation result.

In order to suppress a decrease in accuracy of the calculation result, in the present embodiment, the position measurement controller 33 is configured to discriminate position information (hereinafter, referred to as moving object information) on an moving object that moves in an operation region in vicinity of the own vehicle such as the work machine 4 and is configured not to use the moving object information in map creation and position calculation, that is, configured to use the information in which the moving object information has been excluded from the information on an object to be detected.

Figure 12:
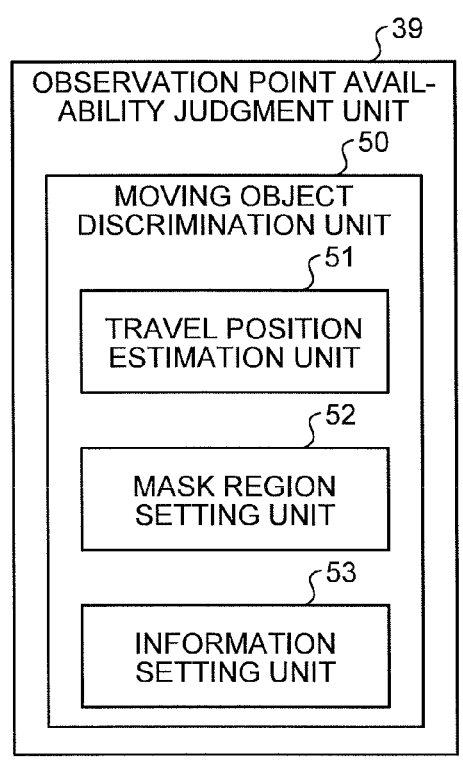
FIG. 12 is a block diagram illustrating an exemplary observation point availability judgment unit.

FIG. 12 is a block diagram illustrating an exemplary observation point availability judgment unit 39. As illustrated in FIG. 12, the observation point availability judgment unit 39 includes a moving object discrimination unit 50. The moving object discrimination unit 50 discriminates moving object information from the detection results of the laser sensor 24B or from map information. The moving object information is position information on a moving object that moves in the operation region. The moving object information is included in the detection information when a moving object that moves in the operation region is detected by the laser sensor 24B. Examples of the moving object include the above-described other work machine 4 crossing the dump truck 2 as the own vehicle and a passenger vehicle that has entered the operation region. Hereinafter, description will follow with reference to a case where the moving object is the other work machine 4.

The moving object discrimination unit 50 includes a travel position estimation unit 51, a mask region setting unit 52, and information setting unit 53. The dump truck 2 can receive other-vehicle position information (moving object position information) related to the position of the other work machine 4, via the wireless communication device 34. The travel position estimation unit 51 estimates the position of the other work machine 4 based on the other-vehicle position information received at the wireless communication device 34. The dump truck 2 may receive other-vehicle position information from the management device 10 or receive other-vehicle position information by vehicle-to-vehicle communication with the other vehicle.

Figure 13:
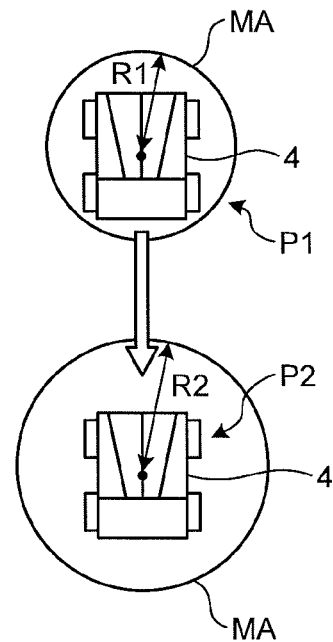
FIG. 13 is a diagram illustrating an exemplary mask region.

The mask region setting unit 52 sets a mask region with dimensions including the other work machine 4, at a position estimated by the travel position estimation unit 51. FIG. 13 is a diagram illustrating an exemplary mask region. As illustrated in FIG. 13, a mask region MA is set as a circular region having a radius R1 with an estimated position of the other work machine 4 as a center, for example. Note that the shape of the mask region MA is not limited to a circle but an ellipse or polygon may be used as setting of the mask region MA.

In a case where the estimated position of the other work machine 4 changes, the mask region setting unit 52 moves the mask region MA along with the change of the estimated position such that the work machine 4 may not be dislocated from the mask region MA. When the other work machine 4 is traveling, for example, the estimated position changes as time elapses. In a case where the estimated position moves from a position P1 to a position P2 as illustrated in FIG. 13, the mask region setting unit 52 moves the mask region MA along with the movement of the estimated position.

In addition, in a case where reception of the other-vehicle position information received from the wireless communication device 34 is interrupted, the estimated position obtained by the travel position estimation unit 51 has more errors as the length of elapsed time after interruption of reception of the other-vehicle position information increases. To cope with this, in order to prevent the other work machine 4 from being dislocated from the mask region MA, it is required to increase the diameter of the mask region MA corresponding to an increase in error of the estimated position. Accordingly, in the setting of a circular mask region MA, the mask region setting unit 52 sets, for example, the radius R of the mask region MA as indicated in the equation below.

$$R = R_E(v + a \cdot dt_s) \cdot dt$$

where, $R_E$ is a maximum radius of the other work machine 4, v is a velocity of the other work machine 4, a is a maximum acceleration of the other work machine 4, $dt_s$ is delay time of the other-vehicle position information, and dt is a time pitch width. Accordingly, in a case, for example, as illustrated in FIG. 13, where the estimated position moves from the position P1 to the position P2 along with the elapsed time after receiving other-vehicle position information, the radius of the mask region MA is set to a radius R2 that is larger than the radius R1 at the position P1 although the error of the estimation position increases. With this configuration, it is possible to suppress dislocation of the work machine 4 from the mask region MA.

The information setting unit 53 discriminates whether information on an object to be detected exists within the mask region MA. The information setting unit 53, in a case where it discriminates existence of information on an object to be detected within the mask region MA, sets the information on an object to be detected existing in the mask region MA as moving object information. Hereinafter, functions of the information setting unit 53 will be described with specific examples.

Figure 14:
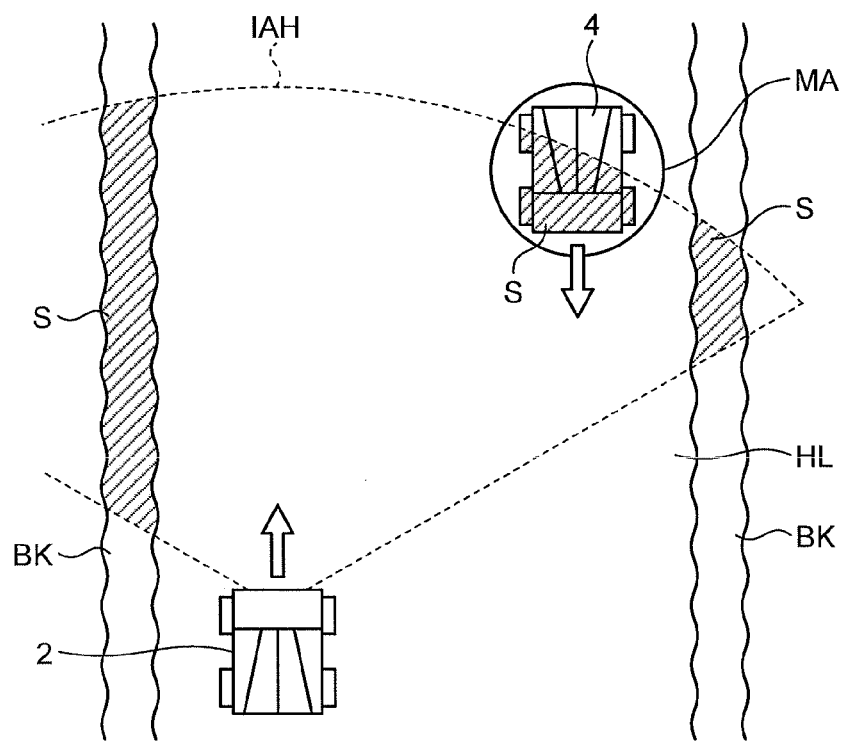
FIG. 14 is a diagram illustrating exemplary detection by a laser sensor.

FIG. 14 is a diagram illustrating an exemplary detection by the laser sensor 24B in a state where the mask region MA has been set. As illustrated in FIG. 14, the dump truck 2 as the own vehicle travels on the transportation path HL while emitting a laser beam to the illumination range IAH. A portion of the bank BK included in the illumination range IAH of the laser beam is detected as a portion S of the upwardly protruding object VP.

Meanwhile, other work machine 4 that is different from the dump truck 2 is traveling as an oncoming vehicle to the dump truck 2. The work machine 4, when it passes the dump truck 2, as illustrated in FIG. 14, enters the illumination range IAH of the laser beam. In this case, a portion of the work machine 4 is also detected as a portion S of the upwardly protruding object VP. Note that the mask region MA has been set on the work machine 4.

FIGS. 15 and 16 are diagrams illustrating exemplary information DI on an object to be detected, displayed on X-Y coordinates obtained by the above-described detection. As illustrated in FIG. 15, the information DI on an object to be detected includes information S1 on an object to be detected, that corresponds a portion S of the upwardly protruding object VP of the bank BK, and information S2 on an object to be detected, that corresponds to a portion S of the upwardly protruding object VP of the work machine 4. With this state, the information setting unit 53 discriminates whether the information S1 on an object to be detected and information S2 on an object to be detected exist within the mask region MA, with inside/outside determination processing, for example. In an example illustrated in FIG. 15, information S2 on an object to be detected is included within the mask region MA. In this case, the information setting unit 53 discriminates existence of information S2 on an object to be detected within the mask region MA and sets the information S2 on an object to be detected as moving object information.

In a case where the moving object information has been set, the position measurement controller 33 removes noise from a detection result of the laser sensor 24B and detects the upwardly protruding object VP as information DI on an object to be detected. When executing operation of generating map information MI (generation operation) from the detected information DI on an object to be detected of the upwardly protruding object VP and operation of identifying the position of the dump truck 2 (identification operation) using the information DI on an object to be detected and the map information MI, the position measurement controller 33 is configured not to use the moving object information, that is, configured to use information from which the moving object information has been excluded. Specifically, in a case where the moving object information exists, the position measurement controller 33, as illustrated in FIG. 16, deletes the moving object information S2 and thereafter executes generation operation and identification operation.

Figure 17:
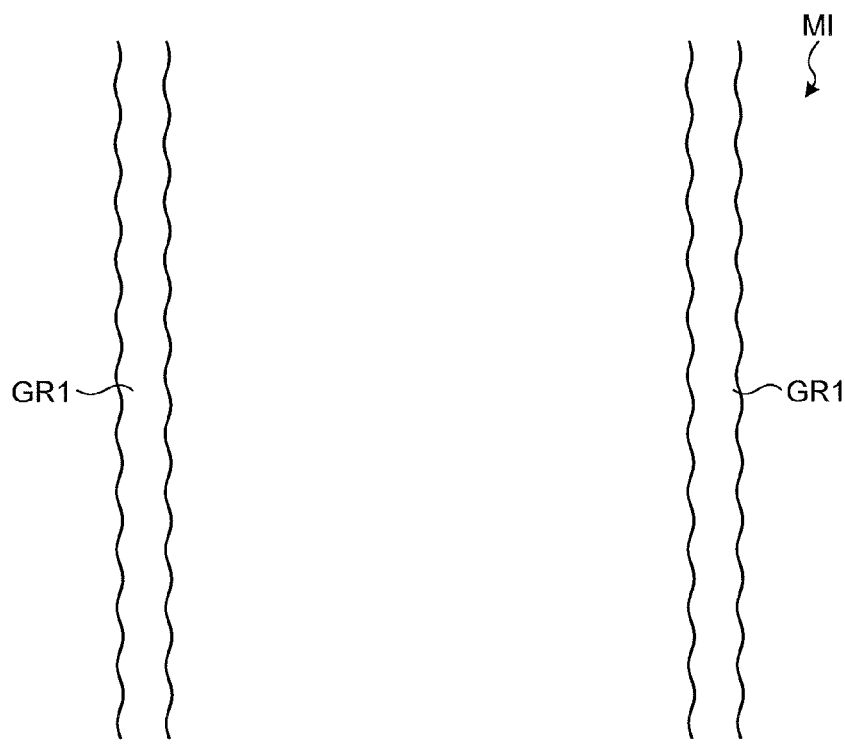
FIG. 17 is a diagram illustrating exemplary map information.

FIG. 17 is a diagram illustrating exemplary map information MI generated from the information DI on an object to be detected, in a state where the moving object information S2 has been deleted. The information DI on an object to be detected does not include the moving object information S2. Accordingly, extraction information extracted from the information DI on an object to be detected does not include the moving object information S2 either. Consequently, as illustrated in FIG. 17, map information MI to be generated includes information GR1 on an object to be detected, generated based on a portion S of the upwardly protruding object VP, but does not include the grid region of the work machine 4, generated based on a portion S of the upwardly protruding object VP. In this manner, it is possible to suppress inclusion of the moving object information in the information DI on an object to be detected, the extraction information, and the map information MI.

The safety controller 40 obtains a relative position between the dump truck 2 and an obstacle based on detection signals of the radar 24A and the laser sensor 24B, and outputs the relative position to the travel controller 20. The travel controller 20 generates a command to control at least one of the accelerator, a braking device 23B, and the operation device 2S, by using the relative position of the dump truck 2 with respect to the obstacle, and controls the dump truck 2 based on the command so as to avoid collision of the dump truck 2 with the obstacle.

The travel controller 20 outputs a command to the braking device 23B to stop the vehicle main body 21 in a case where the determination unit 33A has determined that the GPS position solution is a float solution, a single-point positioning solution, or where a non-positioning state of the GPS position has continued for a predetermined time and the matching navigation position calculation unit 33B has obtained a detection value of the laser sensor 24B in which an ultimate estimation value using the map information MI stored in the map storage database 36 is lower than a predetermined value.

<Work Machine Control Method>

Figure 18:
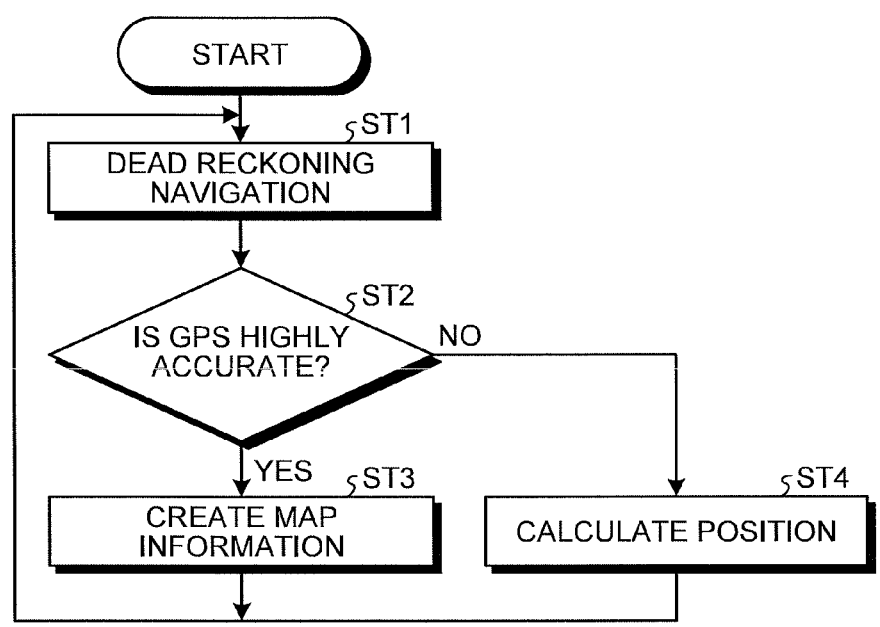
FIG. 18 is an exemplary flowchart of the work machine control system according to the first embodiment.
Figure 19:
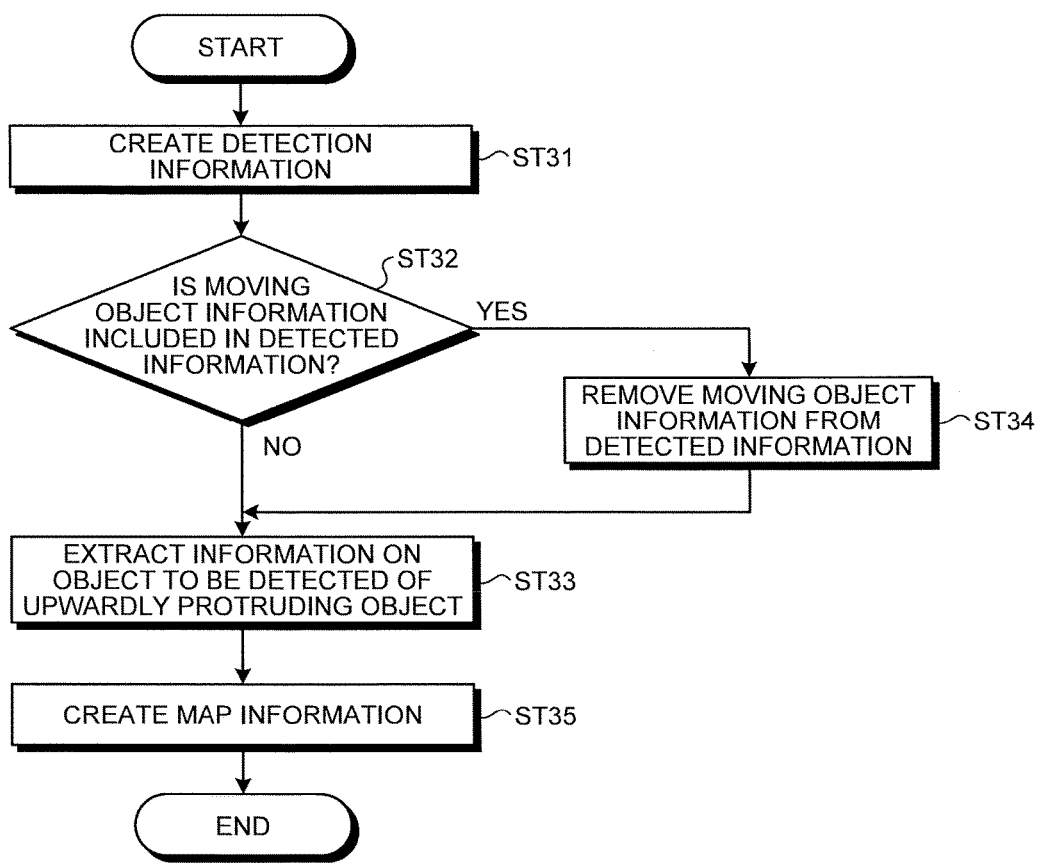
FIG. 19 is an exemplary flowchart of step ST3 in FIG. 18.

Next, a control method of the work machine according to the present embodiment, namely, exemplary operation of the work machine control system 30 will be described. FIG. 18 is an exemplary flowchart of the work machine control system according to the present embodiment. FIG. 19 is an exemplary flowchart of step ST3 in FIG. 18.

The work machine control method is a control method of a work machine of the dump truck 2 that travels along the travel route RP in the operation region. According to the work machine control method, the processing device 12 transmits a command signal to the travel route creation device 32 and the position measurement controller 33, of the dump truck 2, via the wireless communication device 18. The command signal includes information regarding travel conditions of the dump truck 2 and information regarding the position of the work machine 4 other than the own vehicle. The information regarding the travel conditions includes travel route information generated in the processing device 12 and information regarding the travel speed of the dump truck 2. Among command signals transmitted from the processing device 12 via the communication system 9, the travel route creation device 32 stores the travel route information and information regarding the position of the work machine 4 other than the own vehicle into the route position storage unit 32A. When the travel route creation device 32 has received the command signal from the processing device 12, including travel route information, the position measurement controller 33 transmits information regarding the position and azimuth of the dump truck 2 as the own vehicle, to the processing device 12, via the wireless communication device 34. Based on the command signal from the processing device 12, the travel controller 20 controls the accelerator, the braking device 23B, and the operation device 2S, of the dump truck 2, to control travel of the dump truck 2.

Based on the GPS position of the dump truck 2 detected by the GPS receiver 31, the travel controller 20 of the work machine control system 30 executes step ST1 to cause the dump truck 2 to travel along the travel route RP by dead-reckoning navigation. According to the present embodiment, the travel controller 20 causes the dump truck 2 to travel on at least one of the loading location LPA, the dumping location DPA, the transportation path HL, and the intersection IS in accordance with the travel route information generated by the processing device 12 of the management device 10 and with the travel conditions including a travel speed (target travel speed) set by the processing device 12. Dead reckoning navigation is navigation to estimate a current position of a target (dump truck 2) based on the azimuth (change amount of azimuth) and a moving distance from a known position. The azimuth (change amount of azimuth) of the dump truck 2 is detected using the gyro sensor 26 arranged on the dump truck 2. The moving distance of the dump truck 2 is detected using the speed sensor 27 arranged on the dump truck 2. A detection signal of the gyro sensor 26 and a detection signal of the speed sensor 27 are output to the travel controller 20 of the dump truck 2.

The travel controller 20 can obtain the azimuth (change amount of azimuth) of the dump truck 2 from a known origin based on the detection signal from the gyro sensor 26 The travel controller 20 can obtain the moving distance of the dump truck 2 from a known origin based on a detection signal from the speed sensor 27. Based on the detection signal from the gyro sensor 26 and the detection signal from the speed sensor 27, the travel controller 20 generates the amount of control regarding travel of the dump truck 2 such that the dump truck 2 travels along the generated travel route RP. The amount of control includes an accelerator signal, a braking signal, and a steering signal. The travel controller 20 controls travel (operation) of the dump truck 2 based on the steering signal, the accelerator signal, and the braking signal.

Next, an example in which the dump truck 2 travels while an estimated position obtained by using dead-reckoning navigation is being corrected using RTK-GNSS or the matching navigation position calculation unit 33B will be described. When the travel distance of the dump truck 2 becomes long, detection errors accumulated in one or both of the gyro sensor 26 and the speed sensor 27 might cause an error between an estimated position and an actual position. As a result, the dump truck 2 might travel being dislocated from the travel route RP generated by the processing device 12. According to the present embodiment, the travel controller 20 causes the dump truck 2 to travel while correcting the position (estimated position) of the dump truck 2 derived (estimated) by dead-reckoning navigation, using the GPS position detected by the GPS receiver 31 or the position detected by the matching navigation position calculation unit 33B. Based on the detection signal from the gyro sensor 26, the detection signal from the speed sensor 27, and the GPS position from the GPS receiver 31 or the position detected by the matching navigation position calculation unit 33B, the travel controller 20 calculates the amount of control regarding travel of the dump truck 2, including the amount of correction to correct the position of the dump truck 2, such that the dump truck 2 travels along the travel route RP. The travel controller 20 controls travel (operation) of the dump truck 2 based on the calculated amount of correction or calculated amount of control such that the dump truck 2 travels along the travel route RP.

Next, the determination unit 33A of the position measurement controller 33 executes step ST2 that determines whether the GPS positional accuracy of the dump truck 2, detected by the GPS receiver 31, is above a predetermined accuracy. That is, in step ST2, the determination unit 33A of the position measurement controller 33 determines whether the GPS positional accuracy of the dump truck 2 detected by the GPS receiver 31 is high. Specifically, the determination unit 33A of the position measurement controller 33 determines whether the GPS position solution detected by the GPS receiver 31 is a fixed solution.

When the determination unit 33A of the position measurement controller 33 determines that the GPS position solution detected by the GPS receiver 31 is a fixed solution, that is, the GPS positional accuracy of the dump truck 2 detected by the GPS receiver 31 is determined to be high (step ST2: Yes), the grid map creation unit 33C creates map information MI (step ST3). Specifically, when the position measurement controller 33 determines that the GPS positional accuracy detected by the GPS receiver 31 is high, the position measurement controller 33 executes step ST3 that causes the dump truck 2 to autonomously travel along the travel route RP stored in the route position storage unit 32A based on the GPS position of the dump truck 2 detected by the GPS receiver 31, and that extracts detection result regarding the upwardly protruding object VP from the detection result of the laser sensor 24B and stores the extracted detection result regarding the upwardly protruding object VP in the map storage database 36 as map information MI of the operation region.

Specifically, at first, the observation point coordinate conversion unit 38 converts a position of the detection results of the laser sensor 24B displayed on a coordinate defined by the direction and distance from the laser sensor 24B into the coordinate position displayed on the X-Y coordinates so as to generate detection information (step ST31).

Note that, in step ST31, the observation point availability judgment unit 39 initially removes various types of noise from the detection result for which coordinate conversion has been performed by the observation point coordinate conversion unit 38. Specifically, the observation point availability judgment unit 39 removes, as noise, from the detection result for which coordinate conversion has been performed by the observation point coordinate conversion unit 38, a detection result with low reflection intensity, a detection result in which the laser beam seems to have been transmitted through a transparent object, a detection result in which the laser beam seems to have detected dust, a detection result in which the laser beam is reflected from the earth surface, and a detection result in which the laser beam seems to have detected a lump of clay.

The observation point availability judgment unit 39 removes a detection result in which the distance from the dump truck 2 is the maximum distance or more, and the detection result in which the distance is the minimum distance or less, from the detection result in which coordinate conversion is performed by the observation point coordinate conversion unit 38. According to the present embodiment, a predetermined maximum distance is a distance required to remove noise due to sunlight, and a predetermined minimum distance is a distance for removing thick dust noise occurring at close range from the laser sensor 24B.

The observation point availability judgment unit 39 removes a detection result for a predetermined height or less from the earth surface, from the detection result for which coordinate conversion has been performed by the observation point coordinate conversion unit 38. According to the present embodiment, the observation point availability judgment unit 39 removes the detection result for the predetermined height or less. The configuration, however, is not limited to this. In this manner, the observation point availability judgment unit 39 removes various types of noise, or the like, from the detection result.

The observation point availability judgment unit 39 combines the detection result in which various types of noise, or the like, have been removed, with the detection result formed with the grid regions GR the positions of which are displayed on the X-Y coordinates. The observation point availability judgment unit 39 outputs the combined detection result to both the grid map creation unit 33C and the matching navigation position calculation unit 33B.

Next, the moving object discrimination unit 50 judges whether moving object information is included in the detection result (step ST32). In step ST32, the travel position estimation unit 51 estimates the position of the other work machine 4 as a moving object, based on the other-vehicle position information received at the wireless communication device 34. The mask region setting unit 52 sets the mask region MA including the work machine 4 at an estimation position. According to the detected information, the information setting unit 53 discriminates whether information on an object to be detected exists within the mask region MA. In a case where it is discriminated that information on an object to be detected does not exist within the mask region MA, it is judged that the moving object information is not included (step ST32: No), and then, extraction operation is executed to extract information on an object to be detected of the upwardly protruding object VP, from the detected information (step ST33).

In a case where information on an object to be detected exists, the information setting unit 53 sets the information on an object to be detected as moving object information. When the moving object information has been set, the moving object discrimination unit 50 judges that moving object information is included in the detected information (step ST32: Yes). In this case, the position measurement controller 33 deletes the moving object information from the detected information (step ST34), and thereafter, performs extraction operation (step ST33).

In addition, in the above-described step ST1, for example, the observation point availability judgment unit 39 removes various types of noise from the detection result in which coordinate conversion has been performed by the observation point coordinate conversion unit 38. Specifically, the observation point availability judgment unit 39 removes, as noise, from the detection result for which coordinate conversion has been performed by the observation point coordinate conversion unit 38, a detection result with low reflection intensity, a detection result in which the laser beam seems to have been transmitted through a transparent object, a detection result in which the laser beam seems to have detected dust, a detection result in which the laser beam is reflected from the earth surface, and a detection result in which the laser beam seems to have detected a lump of clay.

The observation point availability judgment unit 39 removes the detection result in which the distance is the maximum distance or more and the detection result in which the distance is minimum distance is less, from the detection result in which coordinate conversion has been performed by the observation point coordinate conversion unit 38. According to the present embodiment, a predetermined maximum distance is a distance required to remove noise due to sunlight, and a predetermined minimum distance is a distance for removing thick dust noise occurring at close range from the laser sensor 24B.

The observation point availability judgment unit 39 removes a detection result for a predetermined height or less from the earth surface, from the detection result for which coordinate conversion has been performed by the observation point coordinate conversion unit 38. According to the present embodiment, the observation point availability judgment unit 39 removes the detection result for the predetermined height or less. The configuration, however, is not limited to this. In this manner, the observation point availability judgment unit 39 removes various types of noise, or the like, from the detection result, thereby extracting the detection result related to the upwardly protruding object VP, from the detection result.

The observation point availability judgment unit 39 combines the detection result in which various types of noise, or the like, have been removed, with the detection result formed with the grid regions GR the positions of which are displayed on the X-Y coordinates. The observation point availability judgment unit 39 outputs the combined detection result to both the grid map creation unit 33C and the matching navigation position calculation unit 33B.

Thereafter, the grid map creation unit 33C of the position measurement controller 33 stores the position of the upwardly protruding object VP as the detection result, combined by the observation point availability judgment unit 39, into the map storage database 36 as map information MI of the operation region (step ST35). Map information is created with this procedure.

As illustrated in FIG. 18, the determination unit 33A of the position measurement controller 33 determines that the GPS position solution detected by the GPS receiver 31 is not a fixed solution, that is, determines that the GPS positional accuracy of the dump truck 2 detected by the GPS receiver 31 is a predetermined accuracy or below (step ST2: No). Accordingly, the matching navigation position calculation unit 33B detects the position and azimuth of the dump truck 2 based on the detection result of the laser sensor 24B and on the map information MI stored in the map storage database 36 so as to travel the dump truck 2 along the travel route RP (step ST4). That is, when the position measurement controller 33 determines that the GPS positional accuracy detected by the GPS receiver 31 is the predetermined accuracy or below, the position measurement controller 33 matches the detection result of the laser sensor 24B against the map information MI stored in the map storage database 36, thereby calculating the position and azimuth of the dump truck 2.

Specifically, similarly to the case of map creation, the observation point coordinate conversion unit 38 generates detection information that converts the position of the detection result of the laser sensor 24B displayed on a coordinate defined by the direction and distance from the laser sensor 24B into the position on the X-Y coordinates (step ST41). Next, the moving object discrimination unit 50 judges whether moving object information is included in the detection information (step ST42), and in a case where the moving object discrimination unit 50 has judged that moving object information is not included (step ST42: No), the moving object discrimination unit 50 executes extraction operation to extract information on an object to be detected of the upwardly protruding object VP from the detection information (step S43). When the moving object discrimination unit 50 has judged that the moving object information is included in the detection information (step ST42: Yes), the position measurement controller 33 deletes the moving object information from the detection information (step ST44), and thereafter performs extraction operation (step ST43). Since procedures from step ST41 to step ST44 are equal to the procedures from above-described step ST31 to step ST34, detailed description will be omitted.

Thereafter, the matching navigation position calculation unit 33B calculates the position and azimuth of the dump truck 2 (step ST45). In step ST45, the matching navigation position calculation unit 33B thins out the detection result in which noise has been removed by the observation point availability judgment unit 39 through an isolation filter. Specifically, from among the detection results in which noise has been removed by the observation point availability judgment unit 39, the matching navigation position calculation unit 33B keeps detection results having a predetermined distance therebetween, and removes the other detection results.

The matching navigation position calculation unit 33B integrates the detection result of the gyro sensor 26, the detection result of the speed sensor 27, the detection result of the laser sensor 24B, and the map information MI stored in the map storage database 36 using a particle filter (PF) so as to detect the position and azimuth of the dump truck 2. Specifically, the matching navigation position calculation unit 33B calculates a plurality of positions and azimuths within a range in which the dump truck 2 is estimated to exist at a certain time point based on the azimuth as a detecting result of the gyro sensor 26 and on the travel speed as a detection result of the speed sensor 27.

The matching navigation position calculation unit 33B, based on the map information MI stored in the map storage database 36, estimates a detection result expected to be detected by the laser sensor 24B in a case where the dump truck 2 is located at a position and azimuth at which the dump truck 2 is expected to exist. The matching navigation position calculation unit 33B matches the detection result expected to be detected by the laser sensor 24B against the detection result actually detected by the laser sensor 24B.

Accordingly, the matching navigation position calculation unit 33B calculates likelihood of the detection result expected to be detected, at each of positions and azimuths, by the laser sensor 24B with respect to the detection result actually detected by the laser sensor 24B. The matching navigation position calculation unit 33B normalizes the likelihood of each of the positions and azimuths.

The matching navigation position calculation unit 33B calculates an ultimate estimation value from the likelihood of the detection result to be expected to be detected in each of the positions and azimuths by the laser sensor 24B and each of the positions, and then, calculates a position and azimuth in which the detection result expected to be detected by the laser sensor 24B is the closest to the detection result actually detected by the laser sensor 24B. The matching navigation position calculation unit 33B detects the closest position and azimuth as the position and azimuth of the dump truck 2. The matching navigation position calculation unit 33B, when it has calculated the closest position and azimuth, also calculates estimated accuracy and reliability of the closest position and azimuth.

In FIG. 18, it is possible to configure such that determination is performed, before executing above-described step ST3 or ST4, whether the dump truck 2 is in a state that would decrease accuracy of the map information MI, that is, whether information regarding the position of the upwardly protruding object VP detected by the grid map creation unit 33C would decrease accuracy of the map information MI stored in the map storage database 36. In a case where it is determined that the dump truck 2 is in a state that would decrease accuracy of the map information MI, it is possible to return to step ST1 without executing step ST3 or step ST4.

As described above, according to the present embodiment, when extraction operation, generation operation, and identification operation are performed, it is configured not to use moving object information, namely, information on an object to be detected regarding the other work machine 4 traveling in the operation region, among information DI on an object to be detected, extraction information, and map information MI. Accordingly, it is possible to suppress decrease in accuracy of calculation result when the position of the dump truck 2 is calculated. With this configuration, it is possible to suppress a decrease in productivity in a mine.

Figure 20:
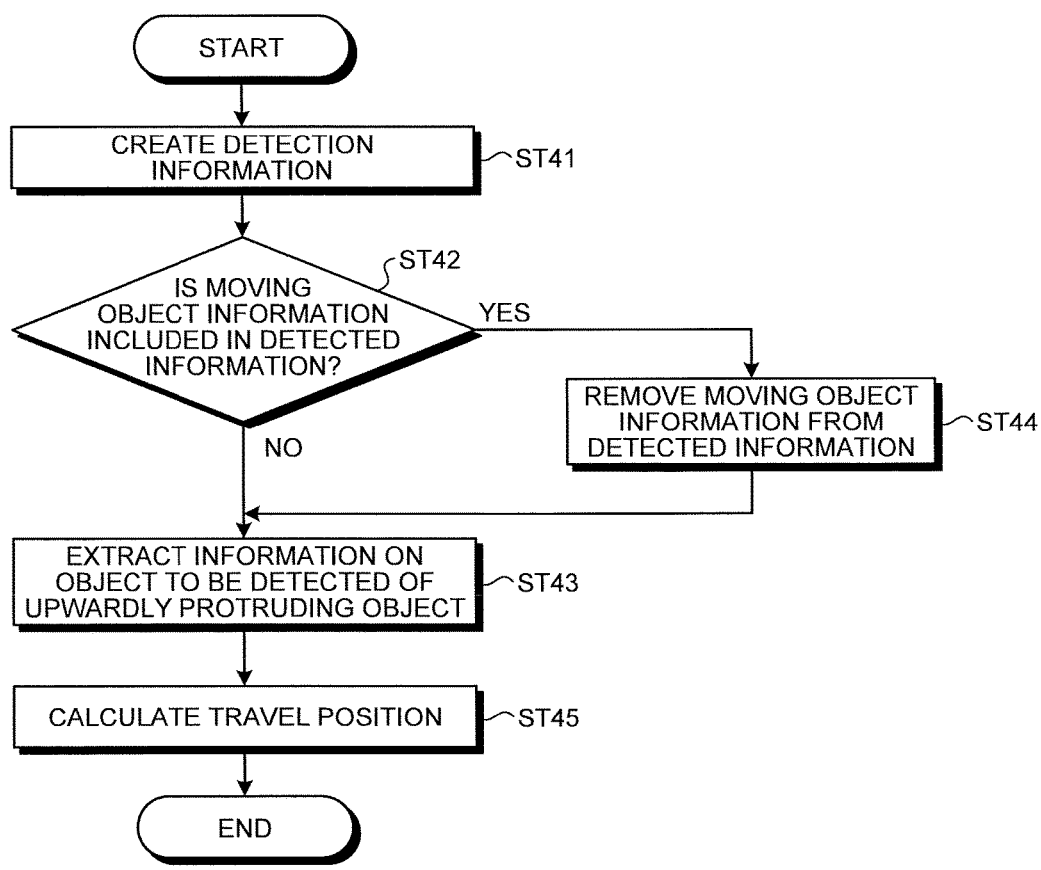
FIG. 20 is an exemplary flowchart of step ST4 in FIG. 18.

Technical scope of the present invention is not limited to the above-described embodiment but can be modified as appropriate without departing from the spirit and scope of the present invention. For example, the above-described embodiment describes an example in which discrimination whether moving object information exists in the information DI on an object to be detected is performed, and in a case where the moving object information exists, the moving object information is deleted and thereafter extraction operation is executed. The configuration, however, is not limited to this. For example, in a case where moving object information exists, it is possible to execute extraction operation without deleting the moving object information. In this case, at the time of calculation of the position of the dump truck 2, for example, before executing step ST41 in FIG. 20, for example, it is possible to judge whether the moving object information is included in the map information MI In a case where it is judged that the moving object information is not included in the map information MI, step ST41 can be executed continuously. Alternatively, in a case where it is judged that the moving object information is included in the map information MI, step ST41 can be executed after the moving object information has been deleted from the map information MI. With this configuration, it is possible to suppress producing an erroneous calculation result.

In addition, the above-described embodiment describes an example in which the travel position of a moving object is estimated based on the other-vehicle position information transmitted from the management facility 7. The configuration, however, is not limited to this. For example, it is possible to provide a configuration capable of detecting information on an object to be detected of the moving object as an oncoming vehicle, such as a camera sensor, on the dump truck 2, separately from the laser sensor 24B. It is also possible to configure such that other-vehicle position information is received by vehicle-to-vehicle communication with the other vehicle.

The above-described embodiment describes an exemplary configuration in which a same dump truck 2 executes generation operation to generate map information and identification operation to identify the position of the dump truck 2. The configuration, however, is not limited to this. For example, it is possible to configure such that the dump truck 2 executes only one of the generation operation and the identification operation. That is, it is possible to configure such that generation operation and identification operation are executed by separate vehicles. For example, it is possible to configure such that a passenger vehicle driven by an operator executes generation operation of the map information. In this case, it is possible to configure such that the passenger vehicle includes a GPS receiver 31, a position measurement controller 33, a wireless communication device 34, a map storage database 36, and a laser sensor 24B. This passenger vehicle, while traveling in the operation region of a mine, can detect the upwardly protruding object VP including a bank BK using the laser sensor 24B and generate map information based on detected information. At this time, similarly to the above-described embodiment, a mask region based on the moving object position information such as an oncoming vehicle is set, and map information by excluding moving object position information within the mask region is generated.

The above-described embodiment describes an example in which the dump truck 2 sets the mask region. The configuration, however, is not limited to this. For example, it is possible to configure such that the management device 10 sets the mask region including the moving object and performs transmission to the dump truck 2 via the communication system 9.

REFERENCE SIGNS LIST

P1, P2 POSITION
S1, S2 INFORMATION ON OBJECT TO BE DETECTED
S2 MOVING OBJECT INFORMATION
BK BANK
DI INFORMATION TO BE DETECTED
MA MASK REGION
HL TRANSPORTATION PATH
MI MAP INFORMATION
IAH, IAV ILLUMINATION RANGE
IS INTERSECTION
DPA DUMPING LOCATION
RP TRAVEL ROUTE
LPA LOADING LOCATION
VP UPWARDLY PROTRUDING OBJECT
1 MANAGEMENT SYSTEM
2 DUMP TRUCK (WORK MACHINE)
7 MANAGEMENT FACILITY
9 COMMUNICATION SYSTEM
10 MANAGEMENT DEVICE
18, 34 WIRELESS COMMUNICATION DEVICE
20 TRAVEL CONTROLLER
24 OBSTACLE SENSOR
24A RADAR (NON-CONTACT SENSOR)
24B LASER SENSOR (NON-CONTACT SENSOR)
30 WORK MACHINE CONTROL SYSTEM
31 GPS RECEIVER (POSITION DETECTION UNIT)
32 TRAVEL ROUTE CREATION DEVICE
33 POSITION MEASUREMENT CONTROLLER (MEASUREMENT OUTPUT UNIT)
33A DETERMINATION UNIT
33B MATCHING NAVIGATION POSITION CALCULATION UNIT
33C GRID MAP CREATION UNIT
36 MAP STORAGE DATABASE
39 OBSERVATION POINT AVAILABILITY JUDGMENT UNIT
50 MOVING OBJECT DISCRIMINATION UNIT
51 TRAVEL POSITION ESTIMATION UNIT
52 MASK REGION SETTING UNIT
53 INFORMATION SETTING UNIT

The invention claimed is:

1. A work machine control system configured to control a work machine that travels in an operation region, the work machine control system comprising:
a position detection unit configured to detect a position of the work machine;
a non-contact sensor configured to detect a position of an object around the work machine; and
a control unit configured to extract information on an object to be detected from a detection result of the position detection unit and a detection result of the non-contact sensor and configured to exclude moving object information that is information on an object to be detected regarding a moving object that moves in the operation region, from the information on an object to be detected.

2. The work machine control system according to claim 1, wherein the information on an object to be detected includes at least one of the detection result of the non-contact sensor and map information generated from a position of an upwardly protruding object that protrudes upwardly, among the detection result.

3. The work machine control system according to claim 2, wherein the control unit includes a measurement output unit configured to detect the position of the upwardly protruding object from the detection result of the non-contact sensor, and configured to execute at least one operation of generation operation that generates the detected position of the upwardly protruding object as the map information and identification operation that identifies the position of the work machine by matching the detection result of the non-contact sensor against the map information.

4. The work machine control system according to claim 3, wherein the measurement output unit, when executing the operation, excludes the detection result of the non-contact sensor from the information on an object to be detected or removes the moving object information from the map information.

5. The work machine control system according to claim 3, wherein the control unit discriminates presence/absence of the moving object information from among the detection result of the non-contact sensor or the map information, and in a case where the moving object information exists, the control unit deletes the moving object information and thereafter executes the generation operation or the identification operation.

6. The work machine control system according to claim 1, comprising a reception unit configured to receive moving object position information related to the position of the moving object, transmitted from a management facility of a mine,
- wherein the control unit estimates the position of the moving object based on the moving object position information received by the reception unit, sets a mask region including the moving object at an estimated position, and determines the information on an object to be detected within the mask region as the moving object information.

7. The work machine control system according to claim 6, wherein the control unit sets dimensions of the mask region according to magnitude of an error included in an estimation result of a travel position of the moving object.

8. The work machine control system according to claim 1, wherein the moving object includes other work machine that travels in the operation region.

9. A work machine comprising:
- a work machine main body that travels in an operation region in a mine; and
- the work machine control system according to claim 1.

10. A work machine management system comprising:
the work machine according to claim 9; and
- a management facility provided in a mine and configured to transmit moving object position information regarding a position of the moving object,
- wherein the work machine control system receives the moving object position information, estimates a travel position of the moving object based on the received moving object position information, sets a mask region including the moving object at an estimated position, and determines the information on an object to be detected within the mask region as the moving object information.

* * * * *